(12) United States Patent
Takahashi

(10) Patent No.: US 10,892,696 B2
(45) Date of Patent: Jan. 12, 2021

(54) PHASE ANGLE ESTIMATION APPARATUS

(71) Applicant: DENSO CORPORATION, Kariya (JP)

(72) Inventor: Tomoya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/658,314

(22) Filed: Oct. 21, 2019

(65) Prior Publication Data
US 2020/0052633 A1 Feb. 13, 2020

Related U.S. Application Data

(63) Continuation of application No. PCT/JP2018/014739, filed on Apr. 6, 2018.

(30) Foreign Application Priority Data

Apr. 24, 2017 (JP) ................... 2017-085239

(51) Int. Cl.
*H02P 21/09* (2016.01)
*H02P 21/22* (2016.01)
*B62D 5/04* (2006.01)

(52) U.S. Cl.
CPC .............. *H02P 21/09* (2016.02); *H02P 21/22* (2016.02); *B62D 5/0421* (2013.01); *B62D 5/0463* (2013.01); *H02P 2207/055* (2013.01)

(58) Field of Classification Search
CPC .. H02P 6/16; H02P 21/14; H02P 27/06; H02P 21/22; H02P 2207/05; H02P 6/18; H02P 2203/05; H02P 27/08; H02P 21/09; H02P 23/14
See application file for complete search history.

(56) References Cited

U.S. PATENT DOCUMENTS

| | | | | |
|---|---|---|---|---|
| 7,439,697 | B2* | 10/2008 | Miyazaki | H02M 7/53875 318/400.41 |
| 8,436,573 | B2* | 5/2013 | Uryu | B62D 5/046 318/801 |
| 10,116,198 | B2* | 10/2018 | Kaeriyama | H02M 7/5395 |
| 10,651,773 | B2* | 5/2020 | Kristof | H02K 17/12 |
| 10,658,966 | B2* | 5/2020 | Yamakawa | H02P 6/182 |

FOREIGN PATENT DOCUMENTS

JP 3687603 B2 8/2005

* cited by examiner

*Primary Examiner* — Thai T Dinh
(74) *Attorney, Agent, or Firm* — Oliff PLC

(57) ABSTRACT

At least one of conditions are satisfied, the conditions are a condition that directions of vectors of N sets of first pulse voltages are different from each other, a condition that directions of vectors of N sets of second pulse voltages are different from each other, and a condition that directions of vectors of N sets of third pulse voltages are different from each other. Further, periods in which voltages having different directions of the vectors among the N sets of the first, the second and the third pulse voltages, are applied at least partially overlap with each other.

10 Claims, 25 Drawing Sheets

PHASE ANGLE ESTIMATION APPARATUS

CROSS-REFERENCE TO RELATED APPLICATION

The present application is a continuation application of International Application No. PCT/JP2018/014739, filed on Apr. 6, 2018, which claims priority to Japanese Patent Application No. 2017-085239 filed on Apr. 24, 2017, the entire content of which is incorporated herein by reference.

TECHNICAL FIELD

The present disclosure relates to estimation of a phase angle of a synchronous motor.

BACKGROUND

JP 3687603 B discloses a method for detecting an amount of change of a current generated when a pulse voltage is applied for a synchronous motor and estimating a phase angle indicating a magnetic pole position from the change amount of the current.

SUMMARY

One aspect of the present disclosure is a phase angle estimation apparatus which estimates a phase angle of a rotor for a motor including the rotor as a field, and N (N is an integer of 2 or greater) sets of coils each having respective drive systems.

The phase angle estimation apparatus includes an applying unit configured to apply first pulse voltages, apply second pulse voltages at a timing different from a timing at which the first pulse voltages are applied, and apply third pulse voltages at a timing different from timings at which the first and the second pulse voltages are applied, to the respective N sets of coils, an acquiring unit configured to acquire a first current vector which is a vector of a current flowing through at least one set of coils among the N sets of coils by application of the first pulse voltages, a second current vector which is a vector of a current flowing through the at least one set of coils by application of the second pulse voltages, and a third current vector which is a vector of a current flowing through the at least one set of coils by application of the third pulse voltages, and an estimating unit configured to estimate the phase angle on the basis of the first, the second and the third current vectors.

At least one of conditions are satisfied, the conditions are a condition that directions of vectors of the N sets of the first pulse voltages are different from each other, a condition that directions of vectors of the N sets of the second pulse voltages are different from each other, and a condition that directions of vectors of the N sets of the third pulse voltages are difference from each other.

Periods in which voltages having different directions of the vectors among the N sets of the first, the second and the third pulse voltages are applied at least partially overlap with each other.

BRIEF DESCRIPTION OF THE DRAWINGS

The above-described and other objects, features and advantages of the present disclosure will become more apparent by reference to the following description in conjunction with accompanying drawings, in which.

DETAILED DESCRIPTION OF THE PREFERRED EMBODIMENTS

As a result of study by the inventor, it was found that, in a case of the above-described prior art, if the pulse voltage is superimposed on a voltage to be applied for driving the motor, the pulse voltage becomes a disturbance and becomes a cause of noise. In view of the above, a problem to be solved by the present disclosure is to suppress noise in the case where a pulse voltage is applied for estimating a phase angle.

One aspect of the present disclosure is a phase angle estimation apparatus which estimates a phase angle of a rotor for a motor including the rotor as a field, and N (N is an integer of 2 or greater) sets of coils each having respective drive systems.

The phase angle estimation apparatus including an applying unit configured to apply first pulse voltages, apply second pulse voltages at a timing different from a timing at which the first pulse voltages are applied, and apply third pulse voltages at a timing different from timings at which the first and the second pulse voltages are applied, to the respective N sets of coils, an acquiring unit configured to acquire a first current vector which is a vector of a current flowing through at least one set of coils among the N sets of coils by application of the first pulse voltages, a second current vector which is a vector of a current flowing through the at least one set of coils by application of the second pulse voltages, and a third current vector which is a vector of a current flowing through the at least one set of coils by application of the third pulse voltages, and an estimating unit configured to estimate the phase angle on the basis of the first, the second and the third current vectors.

At least one of conditions are satisfied, the conditions are a condition that directions of vectors of the N sets of the first pulse voltages are different from each other, a condition that directions of vectors of the N sets of the second pulse voltages are different from each other, and a condition that directions of vectors of the N sets of the third pulse voltages are difference from each other, and periods in which voltages having different directions of the vectors among the N sets of the first, the second and the third pulse voltages are applied at least partially overlap with each other.

According to this aspect, increase in noise by application of the first to the third pulse voltages is suppressed.

Figure 1:
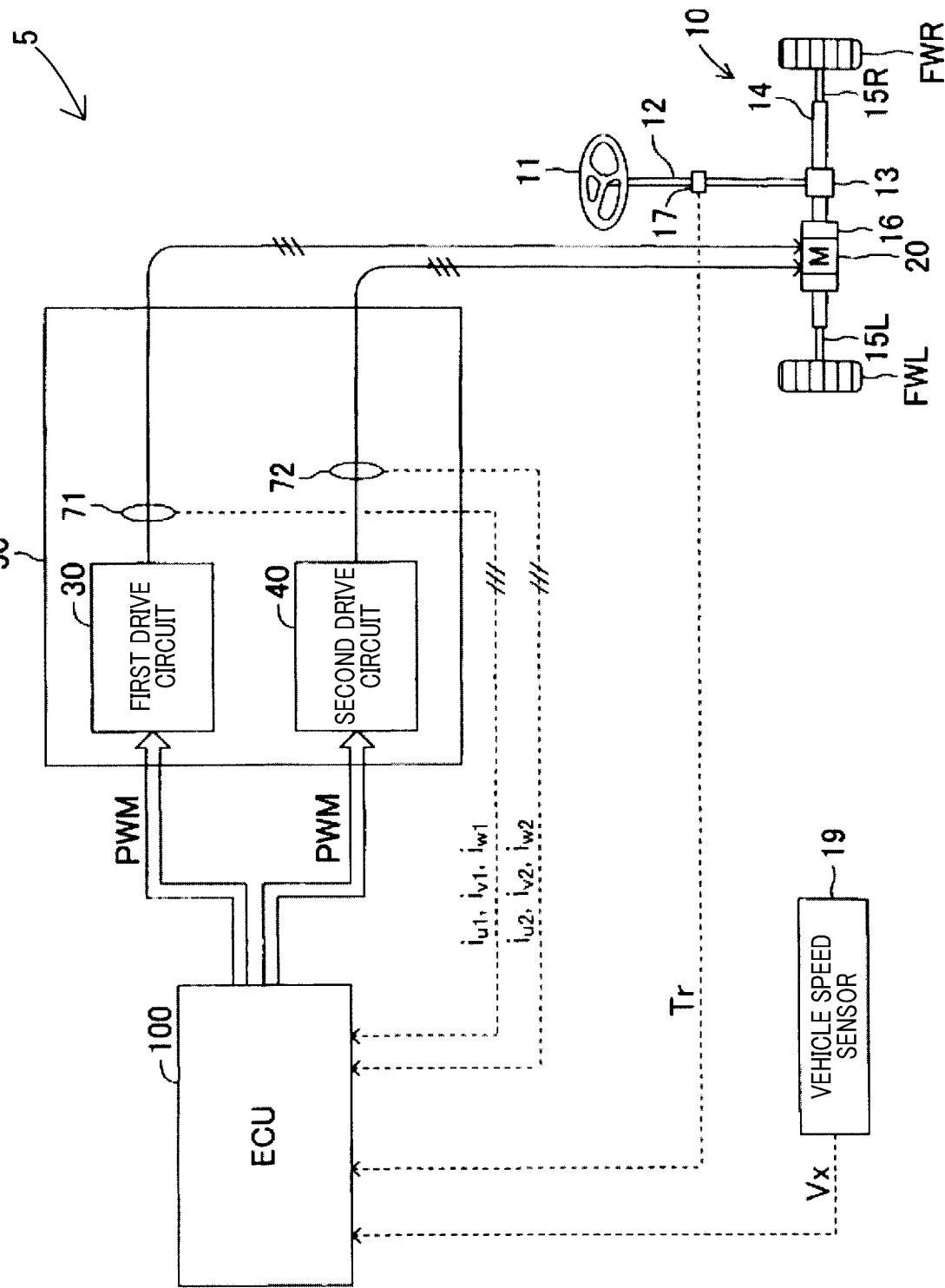
FIG. 1 is a configuration diagram of an electric power steering apparatus.

As illustrated in FIG. 1, an electric power steering apparatus 5 includes a steering mechanism 10, a motor 20, a motor drive unit 50, and an ECU 100 as main units.

The steering mechanism 10 is a mechanism for steering left and right front wheels FWL and FWR by rotation operation of a steering wheel 11. The steering mechanism 10 includes a steering shaft 12. The steering shaft 12 rotates in accordance with rotation of the steering wheel 11.

A pinion gear 13 is connected to a lower end of the steering shaft 12. The pinion gear 13 engages with rack teeth formed on a rack bar 14 to constitute a rack and pinion mechanism along with the rack bar 14. The left and right front wheels FWL and FWR are steered in left and right directions in accordance with displacement of the rack bar 14 in a shaft line direction in accordance with rotation of the steering shaft 12 around the shaft line.

The motor 20 is assembled on the rack bar 14. The motor 20 is assembled in the steering mechanism 10 and generates assist torque. An output shaft of the motor 20 is connected so as to transmit power to the rack bar 14 via a ball screw mechanism 16. The ball screw mechanism 16 functions as a speed reducer and a rotation-linear motion converter. The ball screw mechanism 16 reduces speed of rotation of the motor 20 while converting the rotation into linear motion, and transmits the linear motion to the rack bar 14.

A torque sensor 17 is provided at the steering shaft 12. The torque sensor 17, for example, detects a torsion angle of a torsion bar using a resolver, or the like, and detects steering torque Tr acting on the steering shaft 12 on the basis of this torsion angle. The torsion bar is provided at an intermediate portion of the steering shaft 12. Note that the torsion bar is not illustrated.

Figure 2:
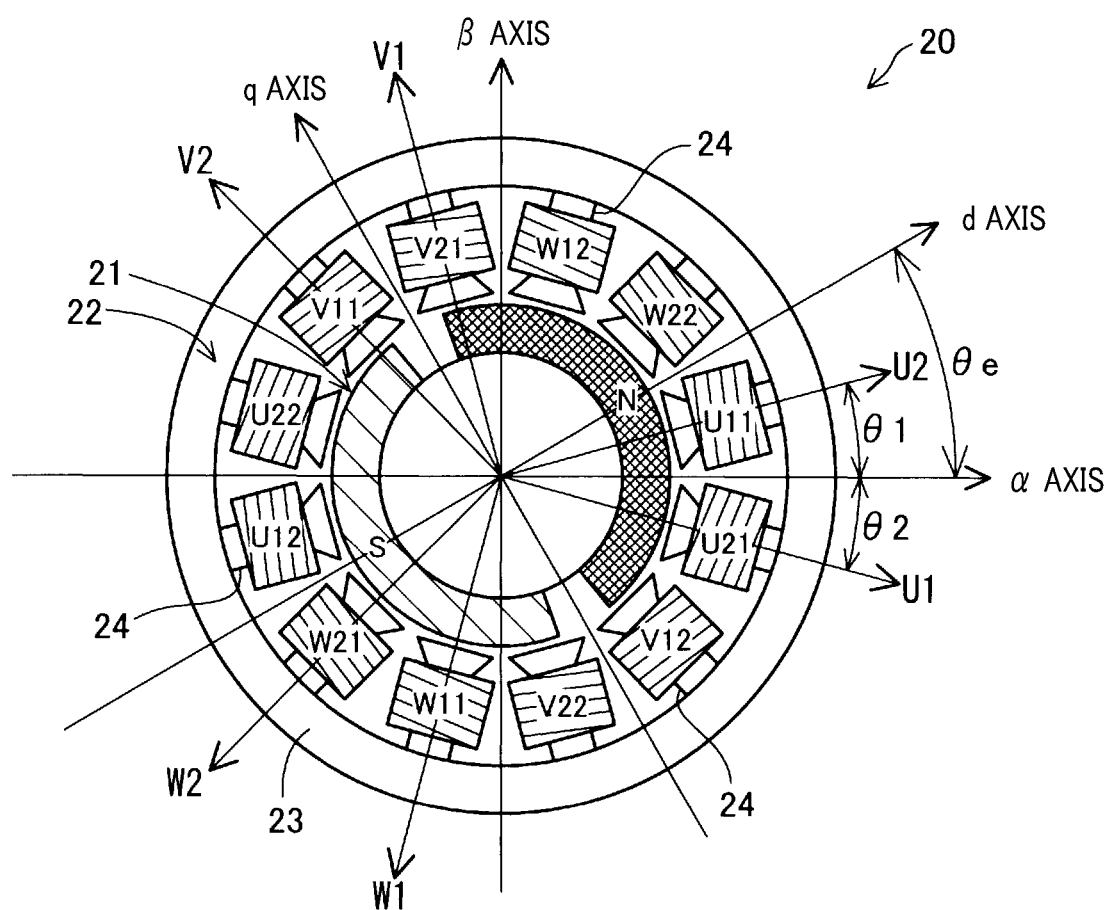
FIG. 2 is a configuration diagram of a motor.

The motor 20 is a permanent magnet synchronous motor. As illustrated in FIG. 2, the motor 20 includes a rotor 21 and a stator 22. The rotor 21 is a field. The rotor 21 is an SPM type rotor. SPM is an acronym of Surface Permanent Magnet. That is, the rotor 21 includes a permanent magnet on a surface of an iron core.

Figure 3:
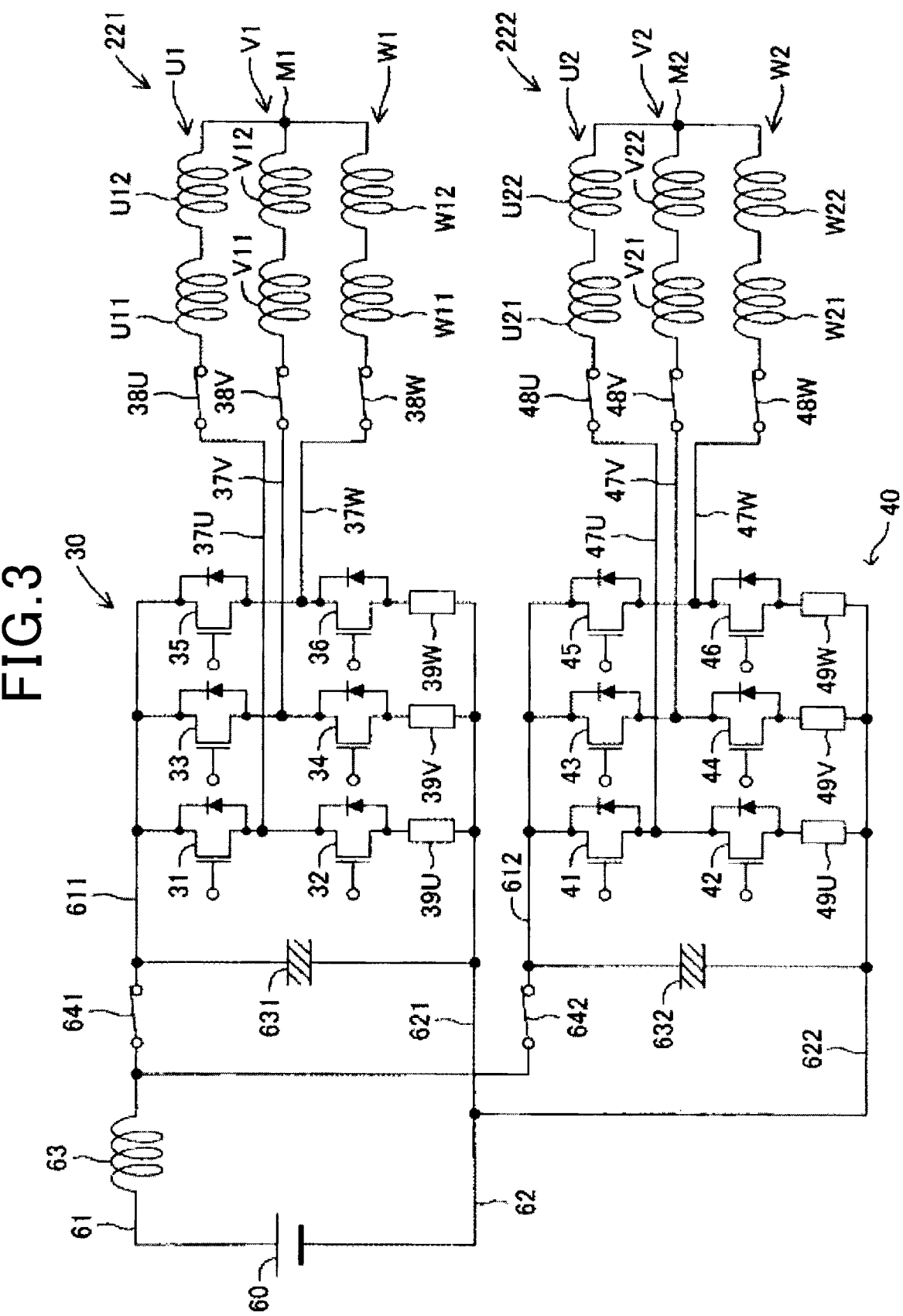
FIG. 3 is a circuit diagram of a first drive circuit and a second drive circuit.

The stator 22 includes a first coil 221 and a second coil 222 illustrated in FIG. 3. The first coil 221 and the second coil 222 are two sets of three-phase coils each having respective drive systems.

The first coil 221 is wound around teeth 24 illustrated in FIG. 2. The teeth 24 are provided at a stator core 23. As illustrated in FIG. 3, the first coil 221 includes a first U-phase coil U1, a first V-phase coil V1 and a first W-phase coil W1.

The first U-phase coil U1 is configured by a U-phase coil U11 and a U-phase coil U12 being connected in series. As illustrated in FIG. 2, the U-phase coil U11 and the U-phase coil U12 are disposed so as to face each other across the rotor 21.

The first V-phase coil V1 is provided at a position displaced from the first U-phase coil U1 in a circumferential direction by 120 degrees. The first V-phase coil V1 is configured by a V-phase coil V11 and a V-phase coil V12 being connected in series. The V-phase coil V11 and the V-phase coil V12 are disposed so as to face each other across the rotor 21.

The first W-phase coil W1 is disposed at a position displaced from the first U-phase coil U1 and the first V-phase coil V1 in a circumferential direction by 120 degrees. The first W-phase coil W1 is configured by a W-phase coil W11 and a W-phase coil W12 being connected in series. The W-phase coil W11 and the W-phase coil W12 are disposed so as to face each other across the rotor 21. The first U-phase coil U1, the first V-phase coil V1 and the first W-phase coil W1 are electrically connected at respective one ends. This one end is a midpoint M1 illustrated in FIG. 3.

The second coil 222 is wound around teeth 24. The second coil 222 includes a second U-phase coil U2, a second V-phase coil V2 and a second W-phase coil W2.

The second U-phase coil U2 is provided at a position displaced from the first U-phase coil U1 in a circumferential direction by 30 degrees. The second U-phase coil U2 is configured by a U-phase coil U21 and a U-phase coil U22 being connected in series. The U-phase coil U21 and the U-phase coil U22 are disposed so as to face each other across the rotor 21.

The second V-phase coil V2 is provided at a position displaced from the second U-phase coil U2 in a circumferential direction by 120 degrees. The second V-phase coil V2 is configured by a V-phase coil V21 and a V-phase coil V22 being connected in series. The V-phase coil V21 and the V-phase coil V22 are disposed so as to face each other across the rotor 21.

The second W-phase coil W2 is provided at a position displaced from the second U-phase coil U2 and the second V-phase coil V2 in a circumferential direction by 120 degrees. The second W-phase coil W2 is configured by a W-phase coil W21 and a W-phase coil W22 being connected in series. The W-phase coil W21 and the W-phase coil W22 are disposed so as to face each other across the rotor 21. The second U-phase coil U2, the second V-phase coil V2 and the second W-phase coil W2 are electrically connected at respective one ends. This one end is a midpoint M2 illustrated in FIG. 3.

As illustrated in FIG. 1, the motor drive unit 50 includes a first drive circuit 30 for energizing the first coil 221, and a second drive circuit 40 for energizing the second coil 222. As illustrated in FIG. 3, power is fed to the first drive circuit 30 from an in-vehicle battery 60 via a first power supply line 611 and a ground line 621. The first drive circuit 30 is a three-phase inverter circuit constituted with six switching elements 31 to 36 which are comprised of MOSFETs. MOSFET is an acronym of Metal Oxide Semiconductor Field Effect Transistor.

The first drive circuit 30 has a configuration in which the following three circuits are connected in parallel. The first circuit is a circuit in which the first switching element 31 and the second switching element 32 are connected in series. The second circuit is a circuit in which the third switching element 33 and the fourth switching element 34 are connected in series. The third circuit is a circuit in which the fifth switching element 35 and the sixth switching element 36 are connected in series.

The first drive circuit 30 includes a first U-phase power supply line 37U, a first V-phase power supply line 37V and a first W-phase power supply line 37W.

The first U-phase power supply line 37U connects between a point between the two switching elements 31 and 32, and the first U-phase coil U1. The first V-phase power supply line 37V connects between a point between the two switching elements 33 and 34, and the first V-phase coil V1. The first W-phase power supply line 37W connects between a point between the two switching elements 35 and 36, and the first W-phase coil W1.

Phase opening relays 38U, 38V and 38W are provided on the three power supply lines 37U, 37V and 37W. By the phase opening relays 38U, 38V and 38W being opened, energization of the first coil 221 can be cut off.

Shunt resistors 39U, 39V and 39W are provided between the ground line 621 and the switching elements 32, 34 and 36. The first current sensor 71 illustrated in FIG. 1 measures a current value flowing through each phase by measuring voltages between both ends of the shunt resistors 39U, 39V and 39W.

As illustrated in FIG. 3, a smoothing capacitor 631 which connects the first power supply line 611 and the ground line 621 is provided at the first drive circuit 30. A power supply relay 641 is provided on the first power supply line 611.

Power is fed to the second drive circuit 40 from the in-vehicle battery 60 via a second power supply line 612 and a second ground line 622. The second drive circuit 40 is a three-phase inverter circuit constituted with six switching elements 41 to 46 which are comprised of MOSFETs, in a similar manner to the first drive circuit 30.

The second drive circuit 40 includes a second U-phase power supply line 47U, a second V-phase power supply line 47V and a second W-phase power supply line 47W.

The second U-phase power supply line 47U connects between a point between the two switching elements 41 and 42 and the second U-phase coil U2. The second V-phase power supply line 47V connects between a point between the two switching elements 43 and 44 and the second V-phase coil V2. The second W-phase power supply line 47W connects between a point between the two switching elements 45 and 46 and the second W-phase coil W2.

Phase opening relays 48U, 48V and 48W are provided on the three power supply lines 47U, 47V and 47W. By the phase opening relays 48U, 48V and 48W being opened, energization of the second coil 222 can be cut off. Shunt resistors 49U, 49V and 49W are provided between the second ground line 622 and the switching elements 42, 44 and 46.

The second current sensor 72 illustrated in FIG. 1 measures a current value flowing through each phase by measuring voltages at both ends of the shunt resistors 49U, 49V and 49W.

A smoothing capacitor 632 which connects the second power supply line 612 and the second ground line 622 is provided at the second drive circuit 40. A power supply relay 642 is provided on the second power supply line 612.

A main power supply line 61 is connected to a positive electrode of the in-vehicle battery 60. The main power supply line 61 branches into a first power supply line 611 and a second power supply line 612. A main ground line 62 is connected to a negative electrode of the in-vehicle battery 60. The main ground line 62 branches into a first ground line 621 and a second ground line 622. A smoothing coil 63 is provided on the main power supply line 61.

The ECU 100 detects a voltage of the in-vehicle battery 60 by receiving input of voltage values of the smoothing capacitors 631 and 632. The ECU 100 utilizes the detected voltage of the in-vehicle battery 60 in calculation of a modulation factor.

A current flowing through the first U-phase coil U1 of the first coil 221, detected by the first current sensor 71 will be referred to as a coil current $i_{u1}$, a current flowing through the first V-phase coil V1 will be referred to as a coil current $i_{v1}$, and a current flowing through the first W-phase coil W1 will be referred to as a coil current $i_{w1}$. In a similar manner, a current flowing through the second U-phase coil U2 of the second coil 222, detected by the second current sensor 72 will be referred to as a coil current $i_{u2}$, a current flowing through the second V-phase coil V2 will be referred to as a coil current $i_{v2}$, and a current flowing through the second W-phase coil W2 will be referred to as a coil current $i_{w2}$. The ECU 100 calculates a terminal potential of each phase from current feedback.

Gates of the respective switching elements 31 to 36 of the first drive circuit 30 and gates of the respective switching elements 41 to 46 of the second drive circuit 40 are connected to the ECU 100, and duty ratios are controlled by a PWM control signal output from the ECU 100. By this means, a drive voltage of the motor 20 is adjusted to a target voltage. The ECU 100 generates a PWM control signal so that the motor 20 outputs target assist torque in a state where the two coils 221 and 222 are energized.

As illustrated in FIG. 2, because two sets of the first coil 221 and the second coil 222 are provided while being displaced in a circumferential direction of the stator 22 by 30 degrees, in the present embodiment, an intermediate position of the U-phase coil U11 and the U-phase coil U21 is defined as an α axis.

A U-phase coil U11 direction viewed from the α axis is defined as an offset angle θ1, and a U-phase coil U21 direction viewed from the α axis is defined as an offset angle θ2. In the present embodiment, the offset angle θ1 is 15 degrees, and the offset angle θ2 is −15 degrees. Phases of currents flowing through the first coil 221 and the second coil 222 are adjusted by the offset angle θ1 and the offset angle θ2.

The ECU 100 acquires measurement values of the torque sensor 17, the current sensors 71 and 72 and the vehicle speed sensor 19 which detects vehicle speed, and signals indicating steering torque Tr, coil currents $i_{u1}$, $i_{v1}$, $i_{w1}$, $i_{u2}$, $i_{v2}$ and $i_{w2}$, and vehicle speed Vx. The ECU 100 calculates command currents to be made to flow through the respective coils 221 and 222 of the motor 20 so as to obtain optimal assist torque in accordance with steering of a driver and controls duty ratios of the respective switching elements 31 to 36 and 41 to 46 of the respective drive circuits 30 and 40 so that the command currents flow.

The ECU 100 can control power supply states where power supplies are supplied to the respective drive circuits 30 and 40 by transmitting opening and closing control signals to the power supply relays 641 and 642.

Control of the motor 20 performed by the ECU 100 will be described. As illustrated in FIG. 2, the ECU 100 controls rotation of the motor 20 by current vector control using a d-q coordinate system. A d axis is a direction in which a magnetic field of a permanent magnet provided at the rotor 21 penetrates. A direction of a north pole is a positive direction of the d axis. A q axis is a direction electrically advancing by 90 degrees with respect to the d axis. A phase angle θe indicating a magnetic pole position of the rotor is expressed with an angle formed by the α axis and the d axis.

A d-axis component of a current vector in the d-q coordinate system will be referred to as a d-axis current, and a q-axis component will be referred to as a q-axis current. The q-axis current acts so as to generate a magnetic field in the q-axis direction. Therefore, the q-axis current generates torque. Meanwhile, because the d-axis current generates a magnetic field in the d-axis direction, the d-axis current does not generate motor torque, and is used in field-weakening control. The ECU 100 controls a current phase so that the current vector moves on the q axis to obtain maximum motor torque efficiency. The ECU 100 estimates a phase angle θe for such current vector control.

Figure 4:
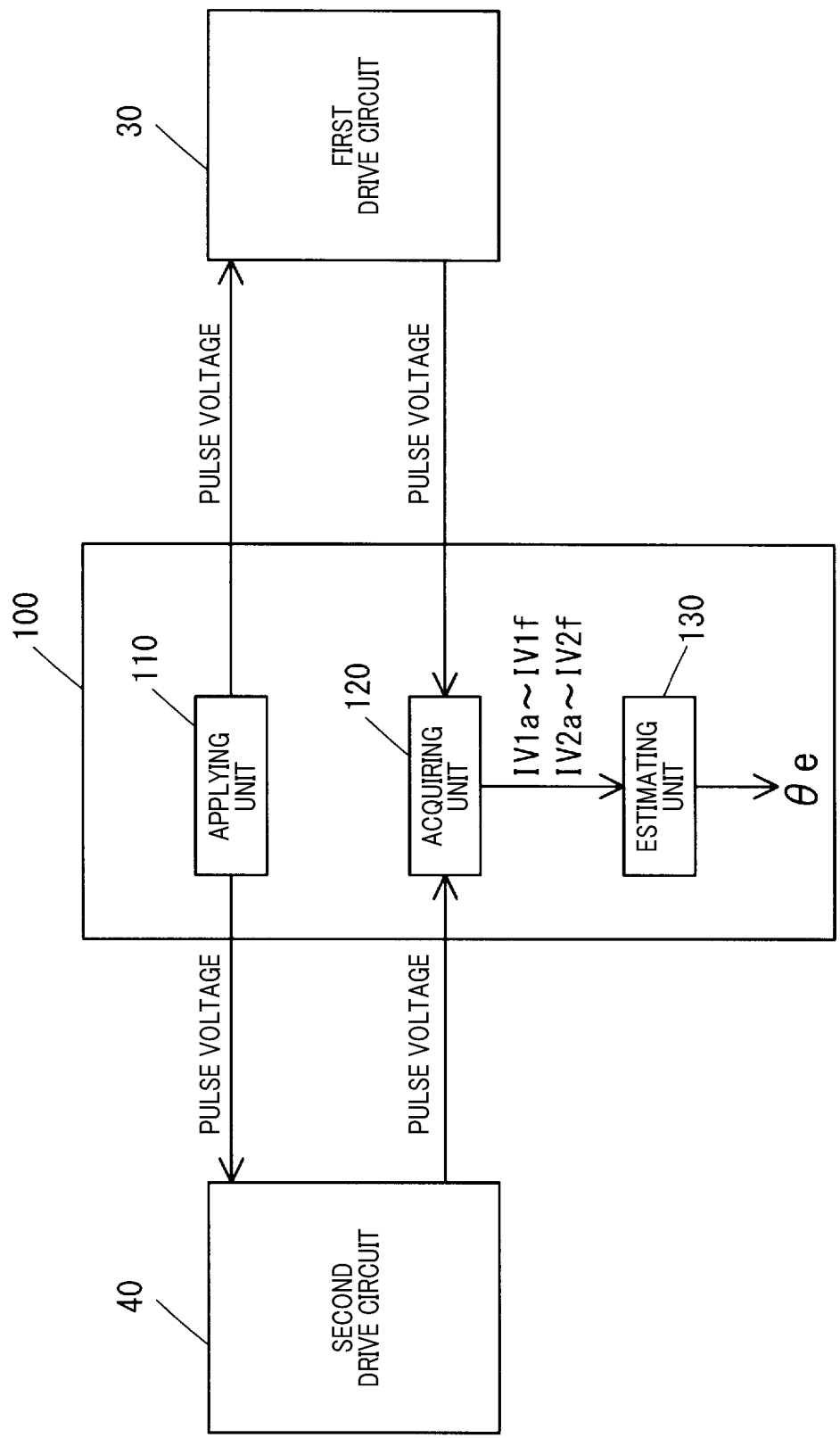
FIG. 4 is a functional block diagram for estimating a phase angle.
Figure 5:
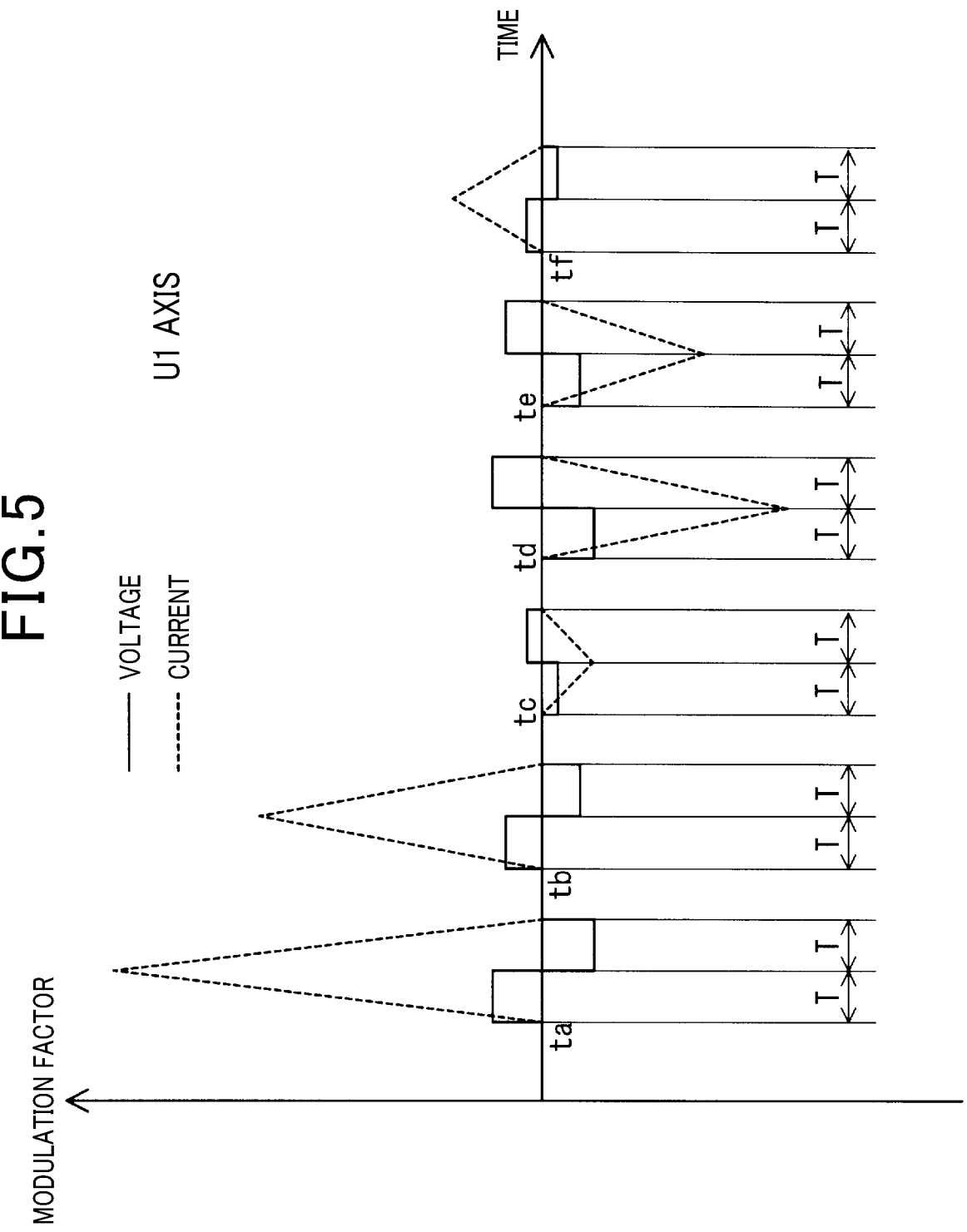
FIG. 5 is a graph indicating temporal change of modulation factors of a voltage and a current on a U1 axis.
Figure 6:
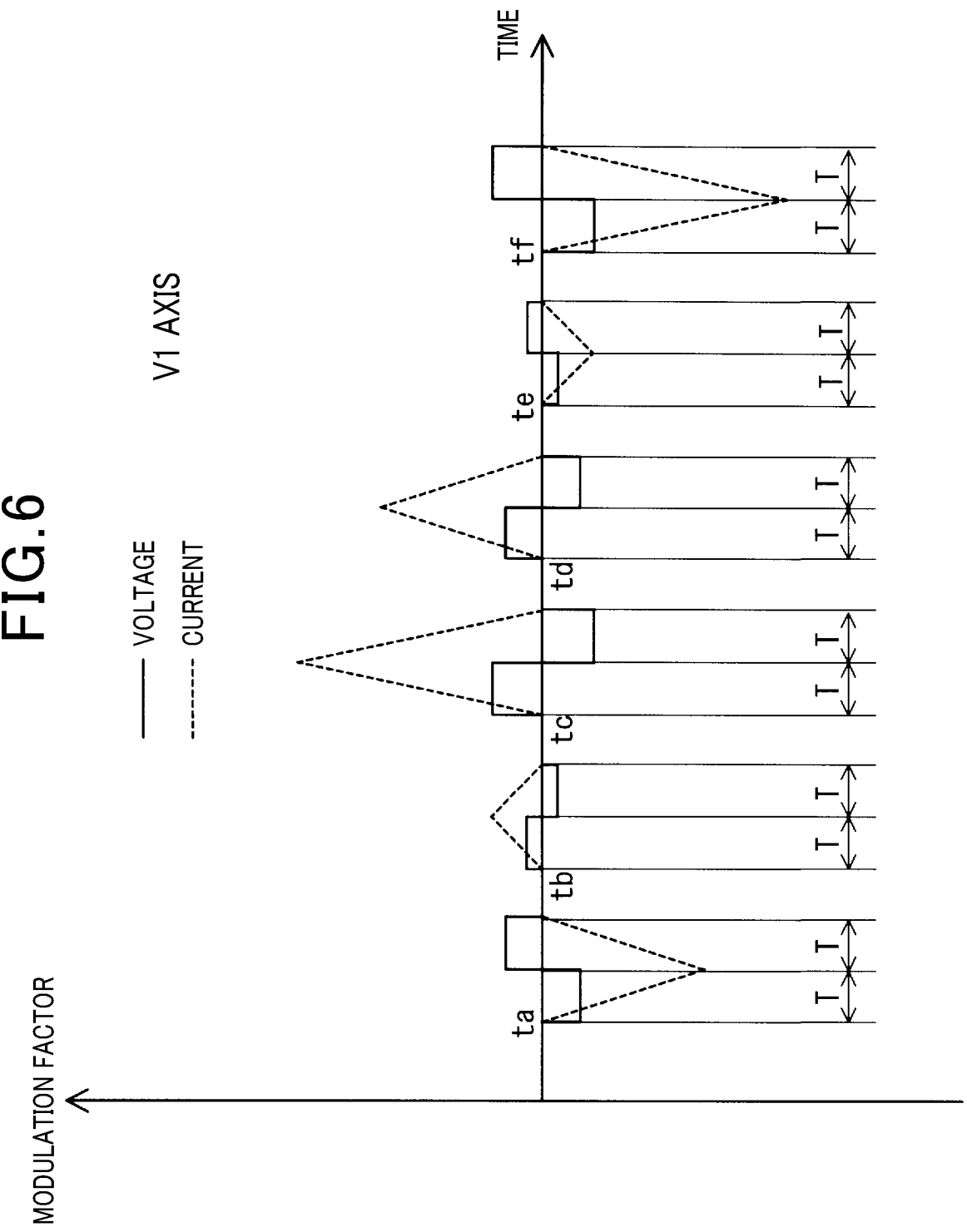
FIG. 6 is a graph indicating temporal change of modulation factors of a voltage and a current on a V1 axis.
Figure 7:
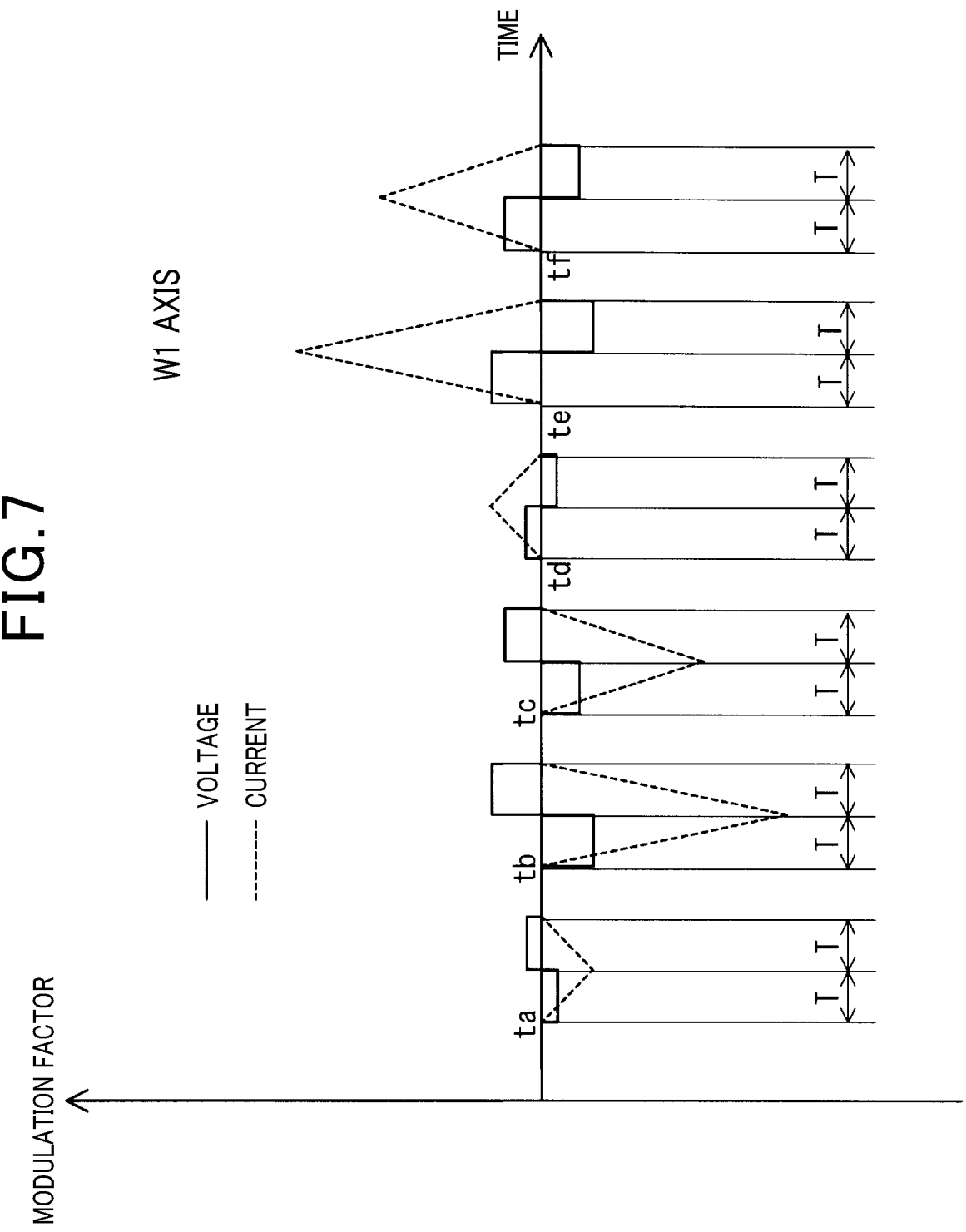
FIG. 7 is a graph indicating temporal change of modulation factors of a voltage and a current on a W1 axis.
Figure 8:
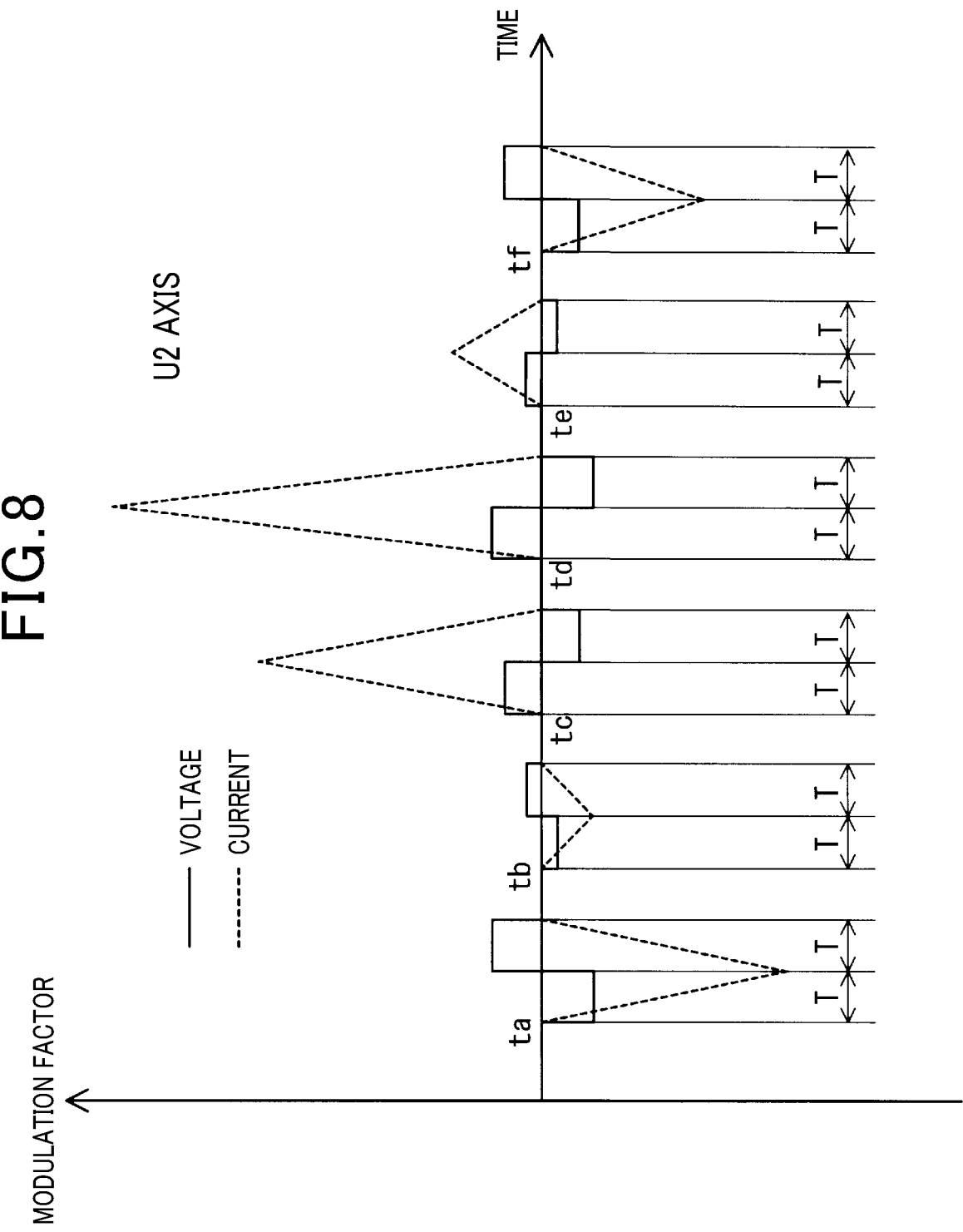
FIG. 8 is a graph indicating temporal change of modulation factors of a voltage and a current on a U2 axis.
Figure 9:
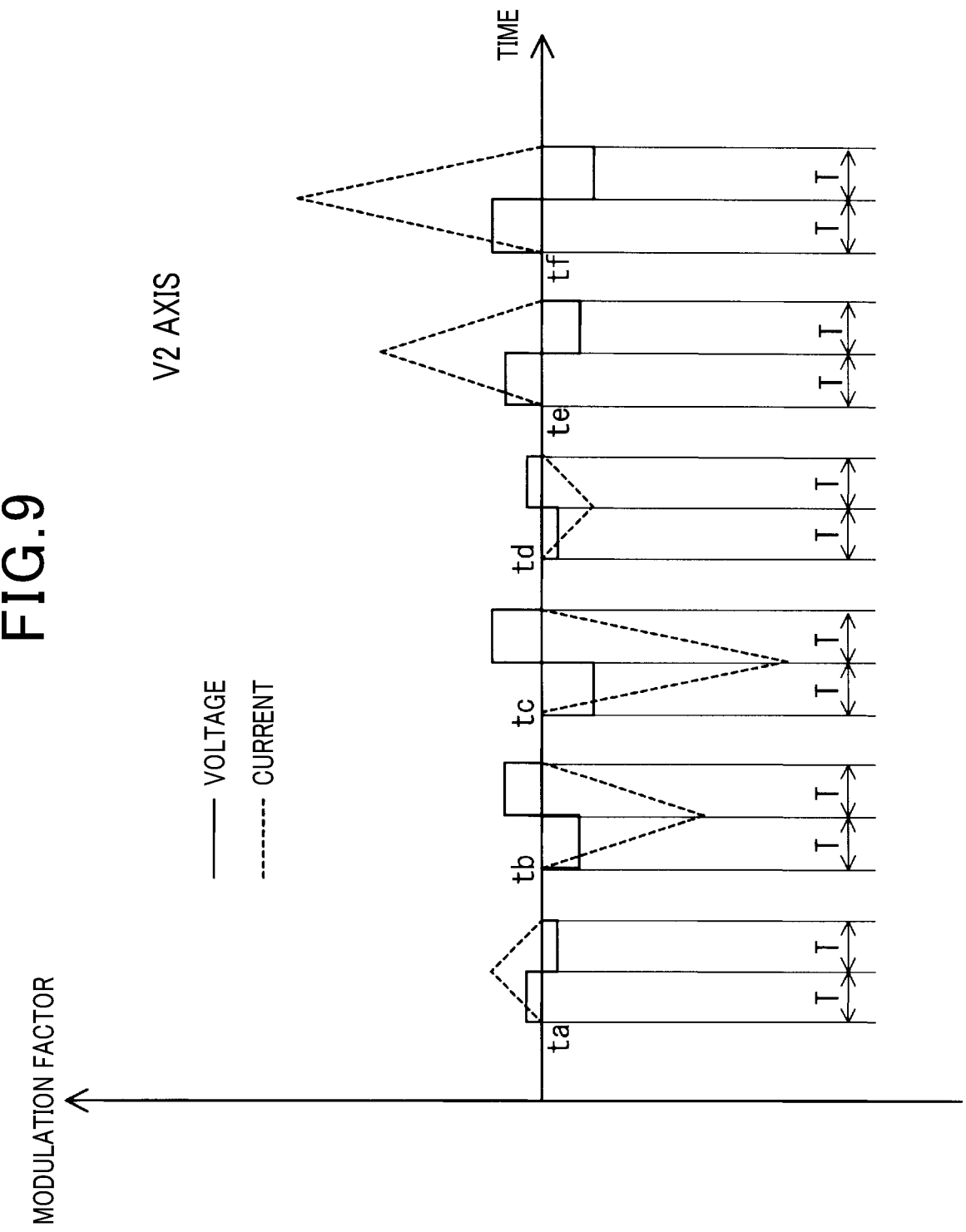
FIG. 9 is a graph indicating temporal change of modulation factors of a voltage and a current on a V2 axis.
Figure 10:
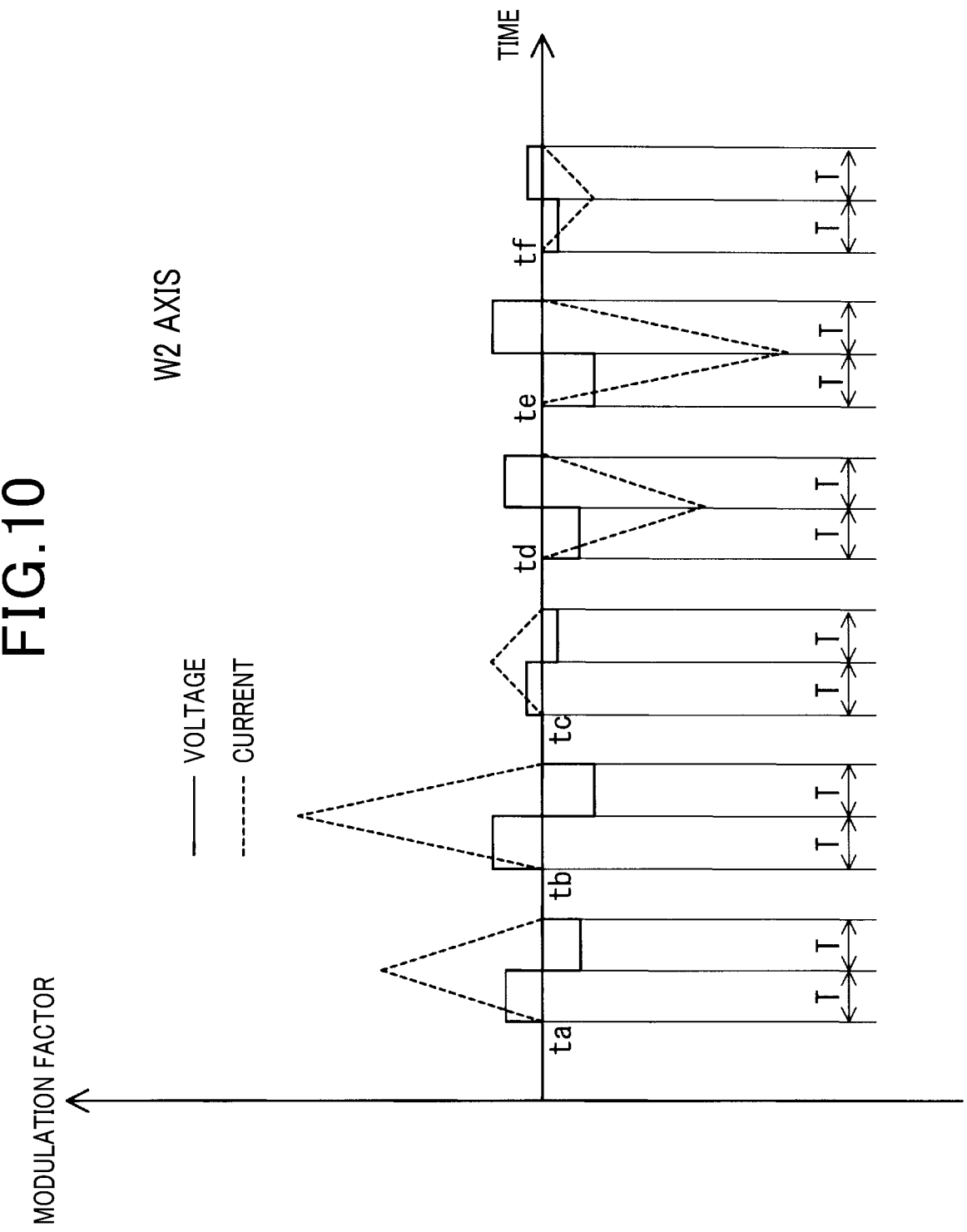
FIG. 10 is a graph indicating temporal change of modulation factors of a voltage and a current on a W2 axis.

As illustrated in FIG. 4, the ECU 100 implements functions as an applying unit 110, an acquiring unit 120 and an estimating unit 130 to estimate the phase angle θe. The ECU 100 implements these functions by executing programs stored in the ECU 100.

As illustrated in FIG. 5 to FIG. 10, the applying unit 110 respectively applies pulse voltages to the first drive circuit 30 and the second drive circuit 40 six times as one set. The applying unit 110 superimposes the pulse voltages on a voltage for generating torque at the rotor 21. A period required for applying the pulse voltages six times is sufficiently shorter than a period required for the current vector for generating the above-described motor torque to rotate one revolution. A waveform of the pulse voltage in the present embodiment is a rectangular wave. An amplitude of the pulse voltage is sufficiently smaller than an amplitude of the voltage for generating the motor torque.

The pulse voltages respectively applied to the first drive circuit 30 and the second drive circuit 40 the first time are applied in the same period. That is, application is started from time ta, and after a period T has elapsed, a sign of the modulation factor is inverted, and after a period T has further elapsed, application is finished. An absolute value of the amplitude of the voltage is the same between before and after inversion. The same will also apply to the pulse voltages to be applied from the second time to the sixth time. In this manner, voltages applied over a period 2T will be referred to as pulse voltages in the present embodiment.

The acquiring unit 120 receives input of pulse currents respectively from the first drive circuit 30 and the second drive circuit 40. The acquiring unit 120 acquires current vectors VI1a to VI1f and VI2a to VI2f respectively corresponding to voltage vectors VV1a to VV1f and VV2a to VV2f on the basis of the input pulse currents.

In the following description, a case will be described as an example where the phase angle θe is 0 degrees, that is, the α axis matches the d axis. Therefore, please see FIG. 11 to FIG. 14 in place of FIG. 5 to FIG. 10 in the following description, because illustration using the d-q coordinate system is easier to understand.

Figure 15:
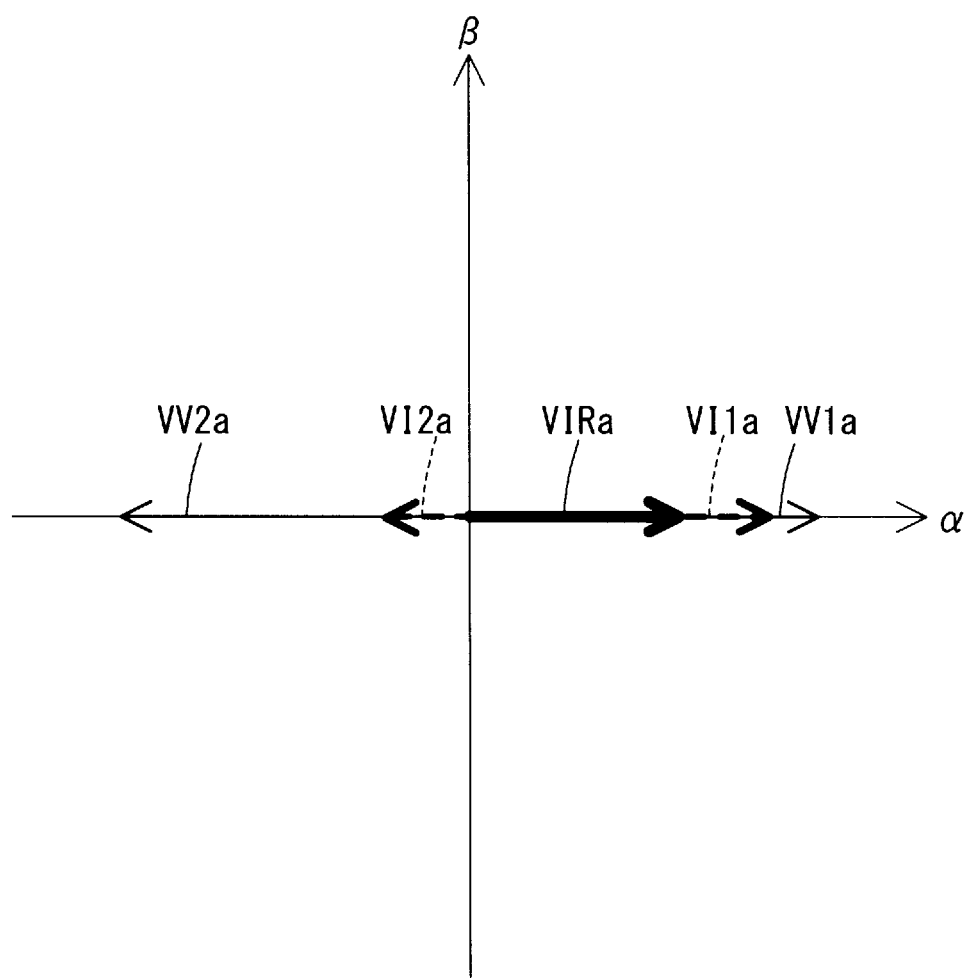
FIG. 15 is a diagram illustrating a voltage vector and a current vector at time ta.

The applying unit 110 applies the pulse voltages from time ta so that the voltage vector VV1a and the voltage vector VV2a illustrated in FIG. 15 are generated in the same period. Note that, originally, directions of the voltage vectors which can be applied are limited to six directions. The six directions are a U1-axis direction, a V1-axis direction and a W1-axis direction, and a direction intermediate between the U1-axis direction and the V1-axis direction, a direction intermediate between the V1-axis direction and the W1-axis direction, and a direction intermediate between the W1-axis direction and the U1-axis direction in a case of the first drive circuit 30. However, it is substantially possible to apply a voltage vector in an arbitrary direction by control of the duty ratios using the PWM control signal.

Figure 16:
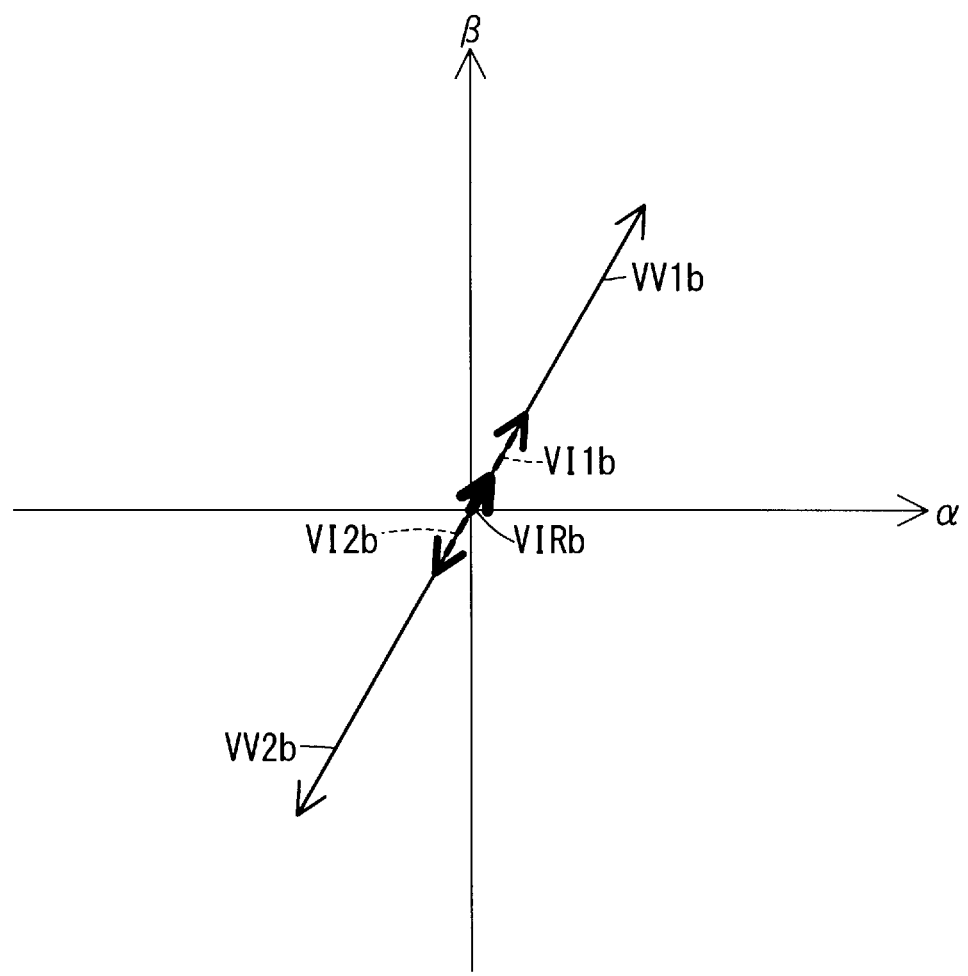
FIG. 16 is a diagram illustrating a voltage vector and a current vector at time tb.
Figure 17:
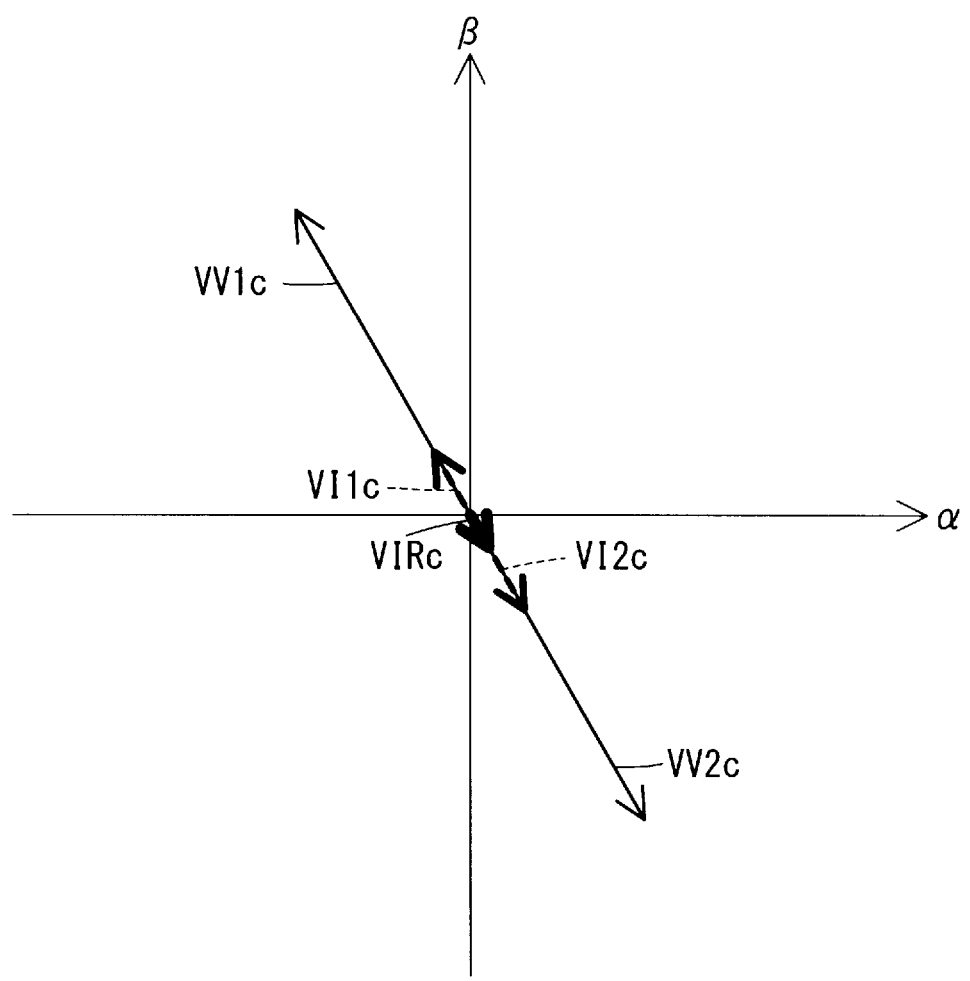
FIG. 17 is a diagram illustrating a voltage vector and a current vector at time tc.
Figure 18:
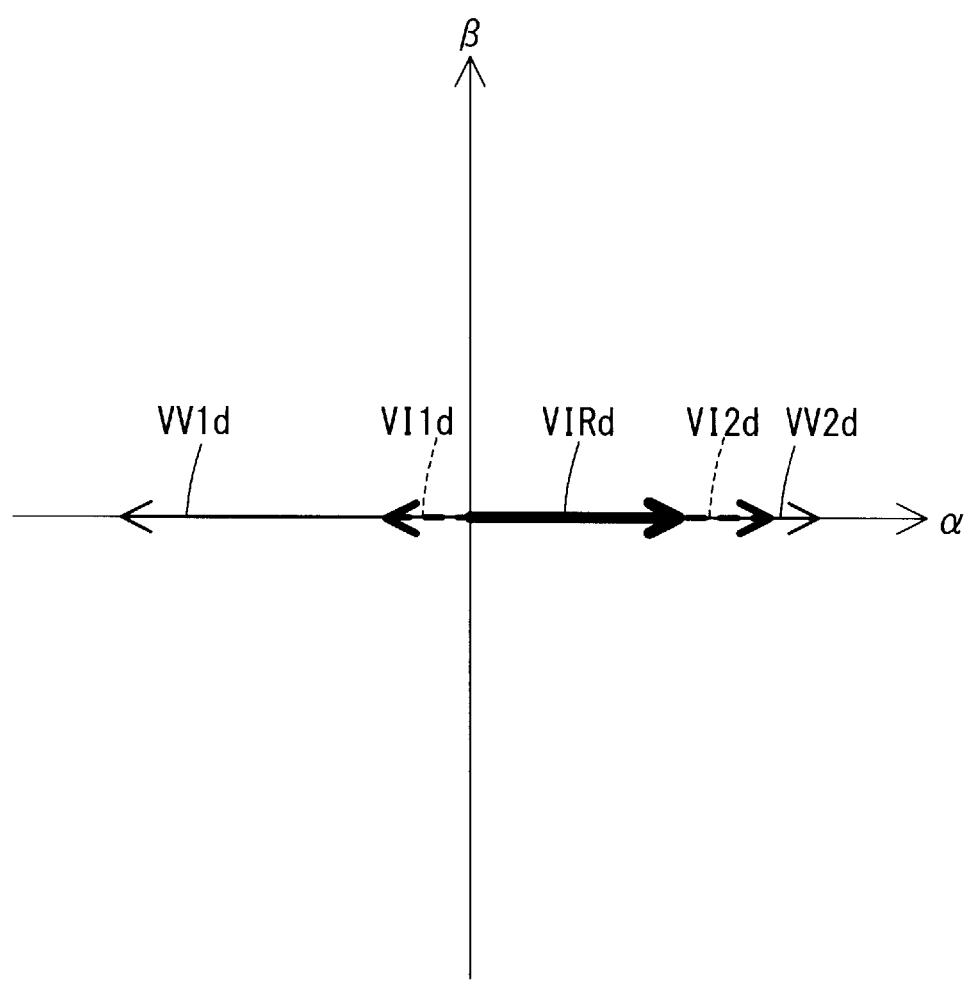
FIG. 18 is a diagram illustrating a voltage vector and a current vector at time td.
Figure 19:
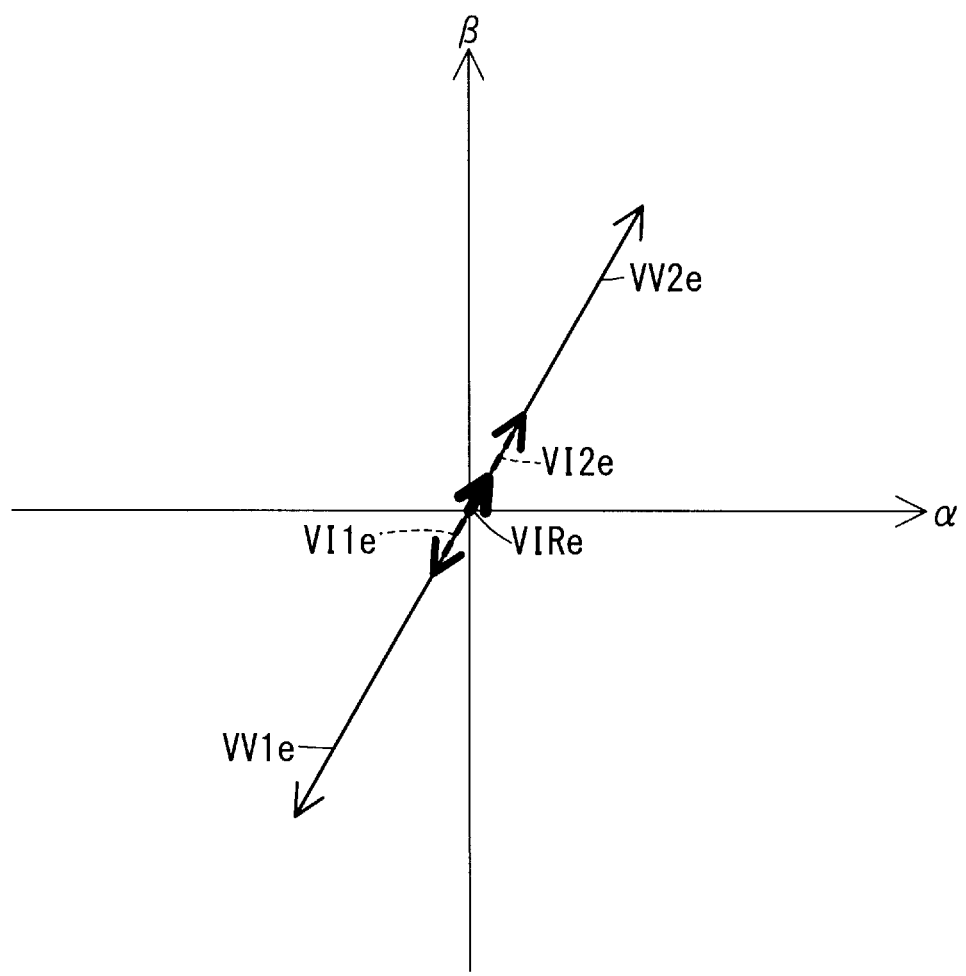
FIG. 19 is a diagram illustrating a voltage vector and a current vector at time te.
Figure 20:
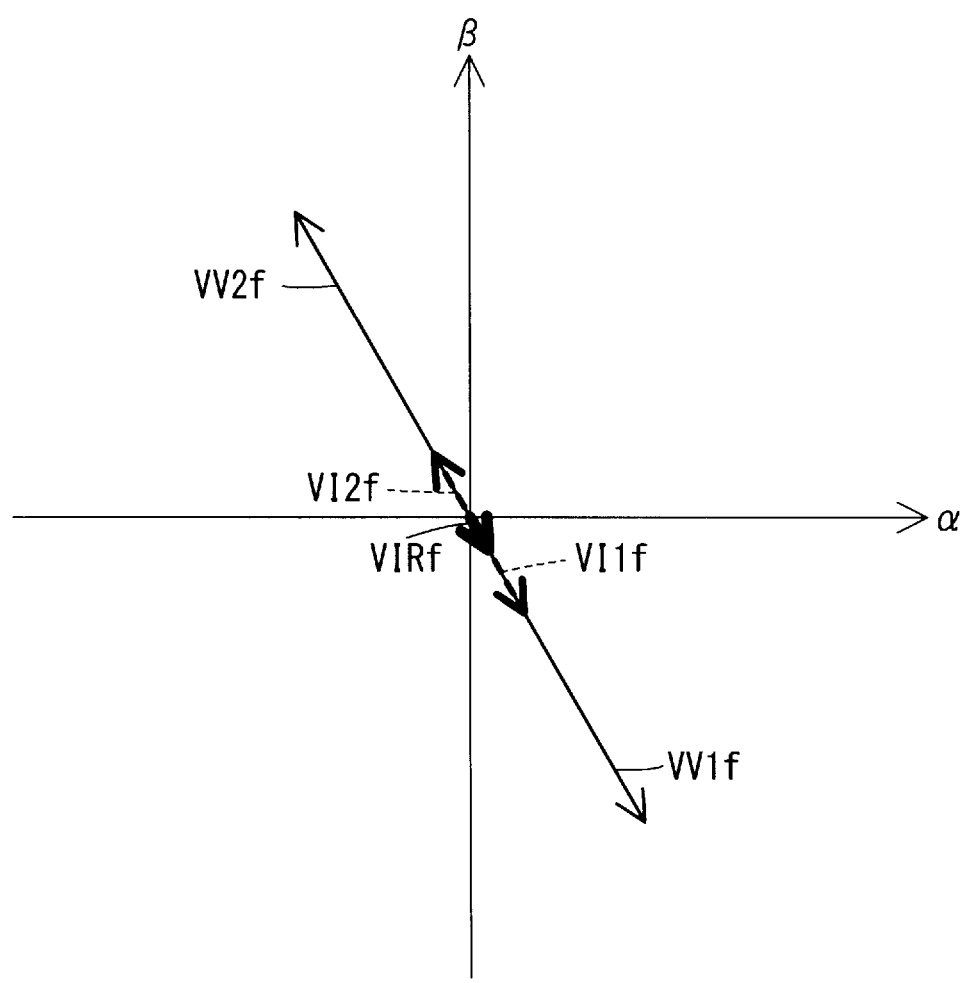
FIG. 20 is a diagram illustrating a voltage vector and a current vector at time tf.

In a similar manner, the applying unit 110 applies the pulse voltages from time tb so that the voltage vector VV1b and the voltage vector VV2b illustrated in FIG. 16 are generated in the same period. The applying unit 110 applies the pulse voltages from time tc so that the voltage vector VV1c and the voltage vector VV2c illustrated in FIG. 17 are generated in the same period. The applying unit 110 applies the pulse voltages from time td so that the voltage vector VV1d and the voltage vector VV2d illustrated in FIG. 18 are generated in the same period. The applying unit 110 applies the pulse voltages from time to so that the voltage vector VV1e and the voltage vector VV1e illustrated in FIG. 19 are generated in the same period. The applying unit 110 applies the pulse voltages from time tf so that the voltage vector VV1f and the voltage vector VV1f illustrated in FIG. 20 are generated in the same period.

Figure 11:
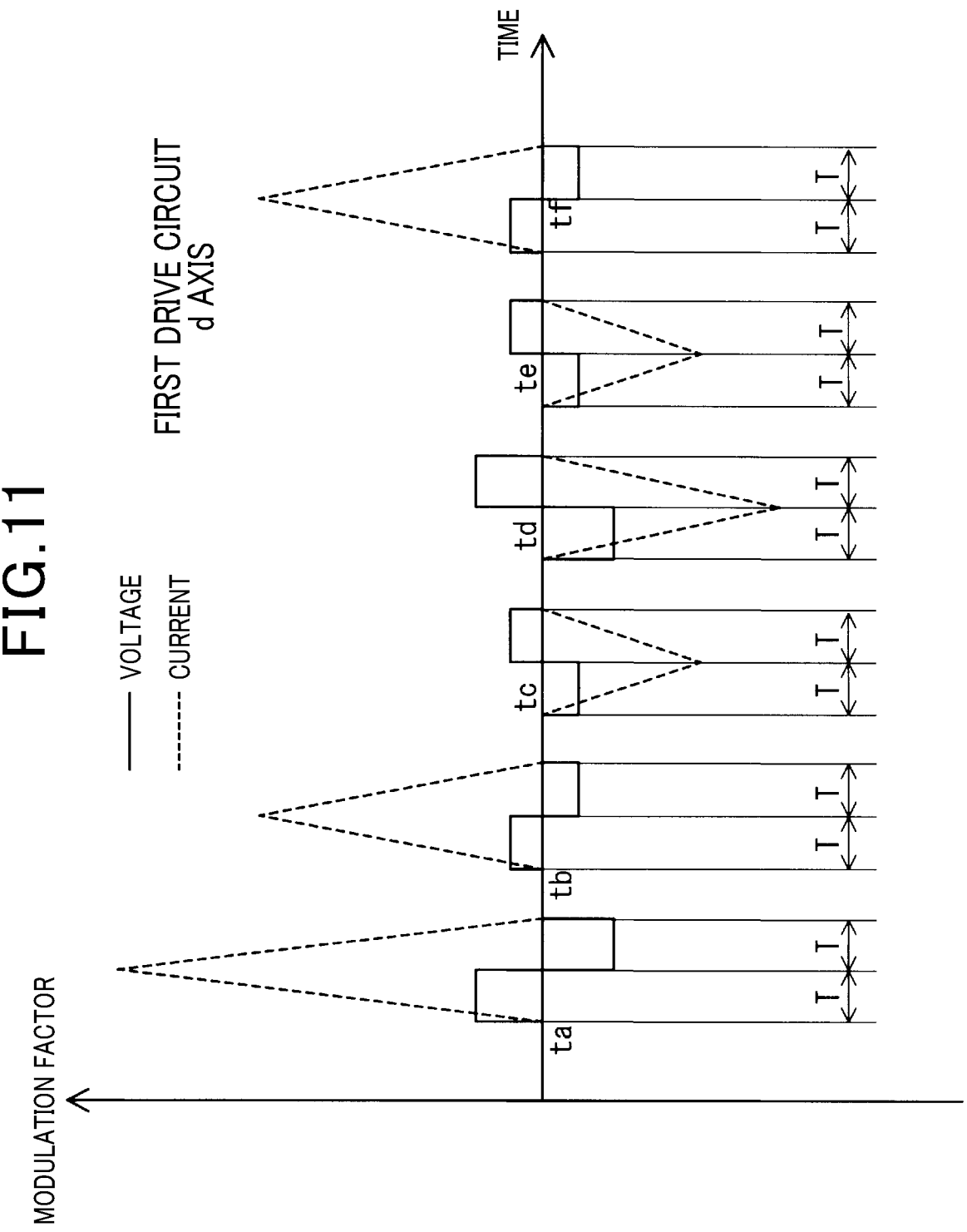
FIG. 11 is a graph indicating temporal change of modulation factors of a voltage and a current on a d axis for the first drive circuit.
Figure 12:
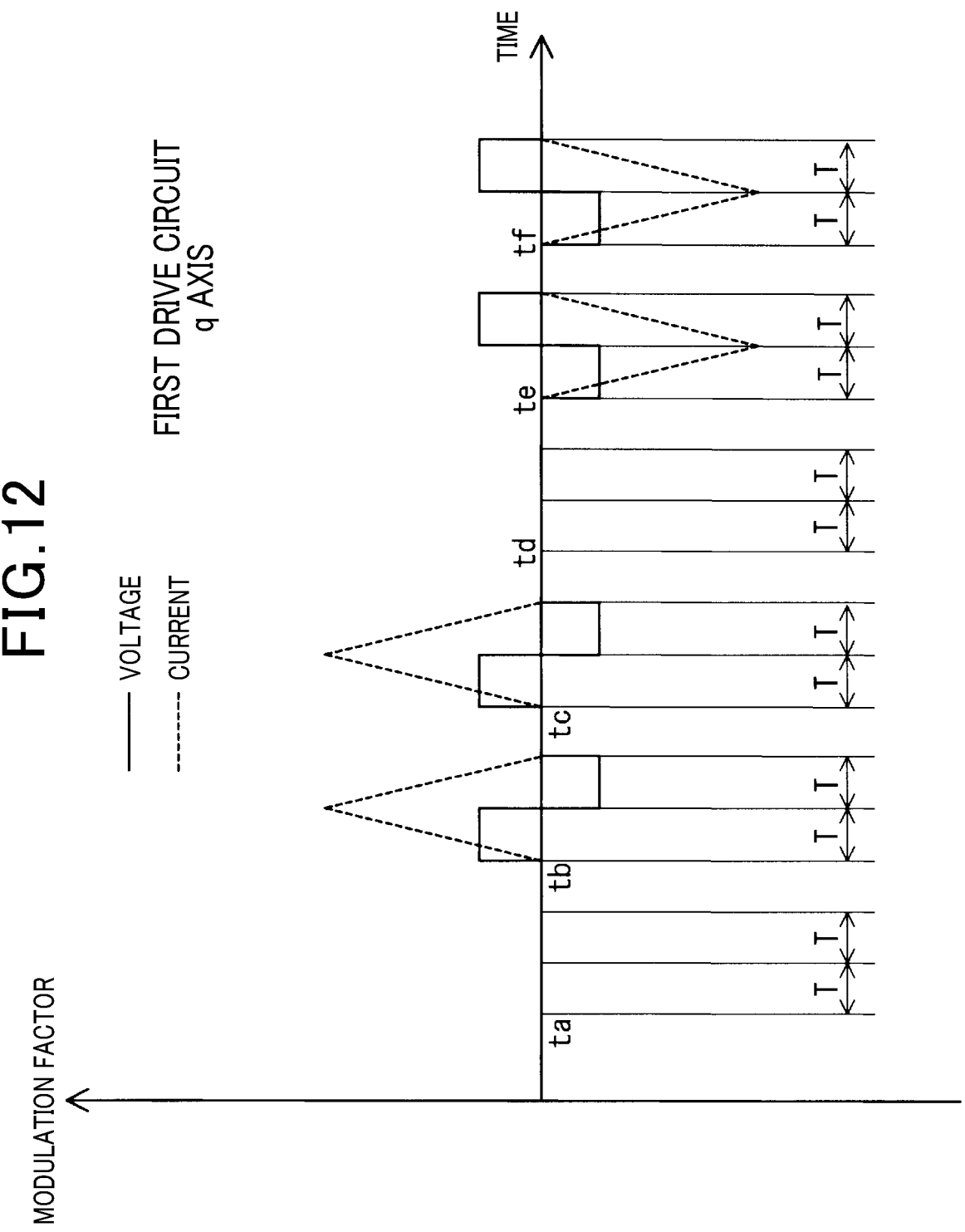
FIG. 12 is a graph indicating temporal change of modulation factors of a voltage and a current on a q axis for the first drive circuit.
Figure 13:
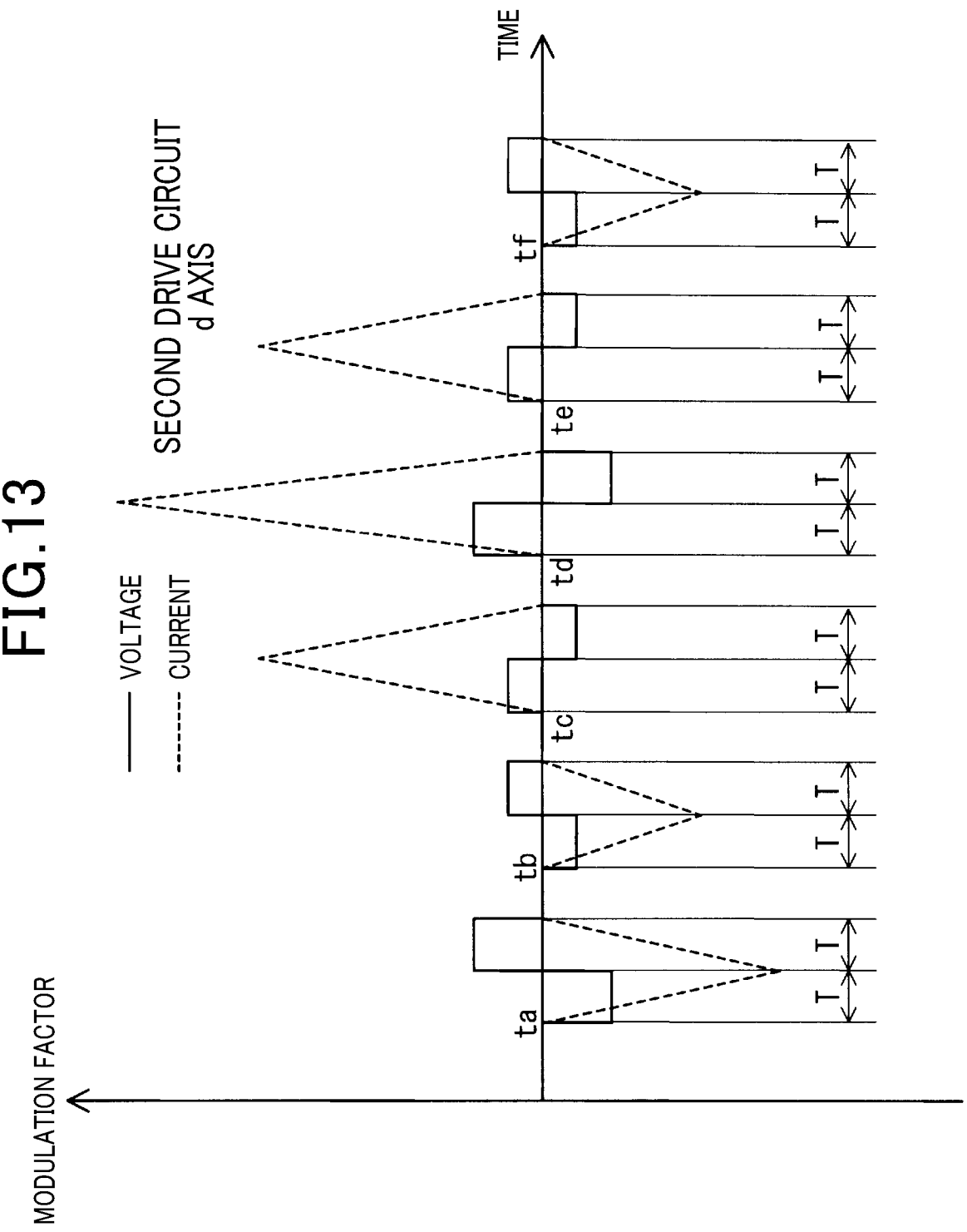
FIG. 13 is a graph indicating temporal change of modulation factors of a voltage and a current on a d axis for the second drive circuit.
Figure 14:
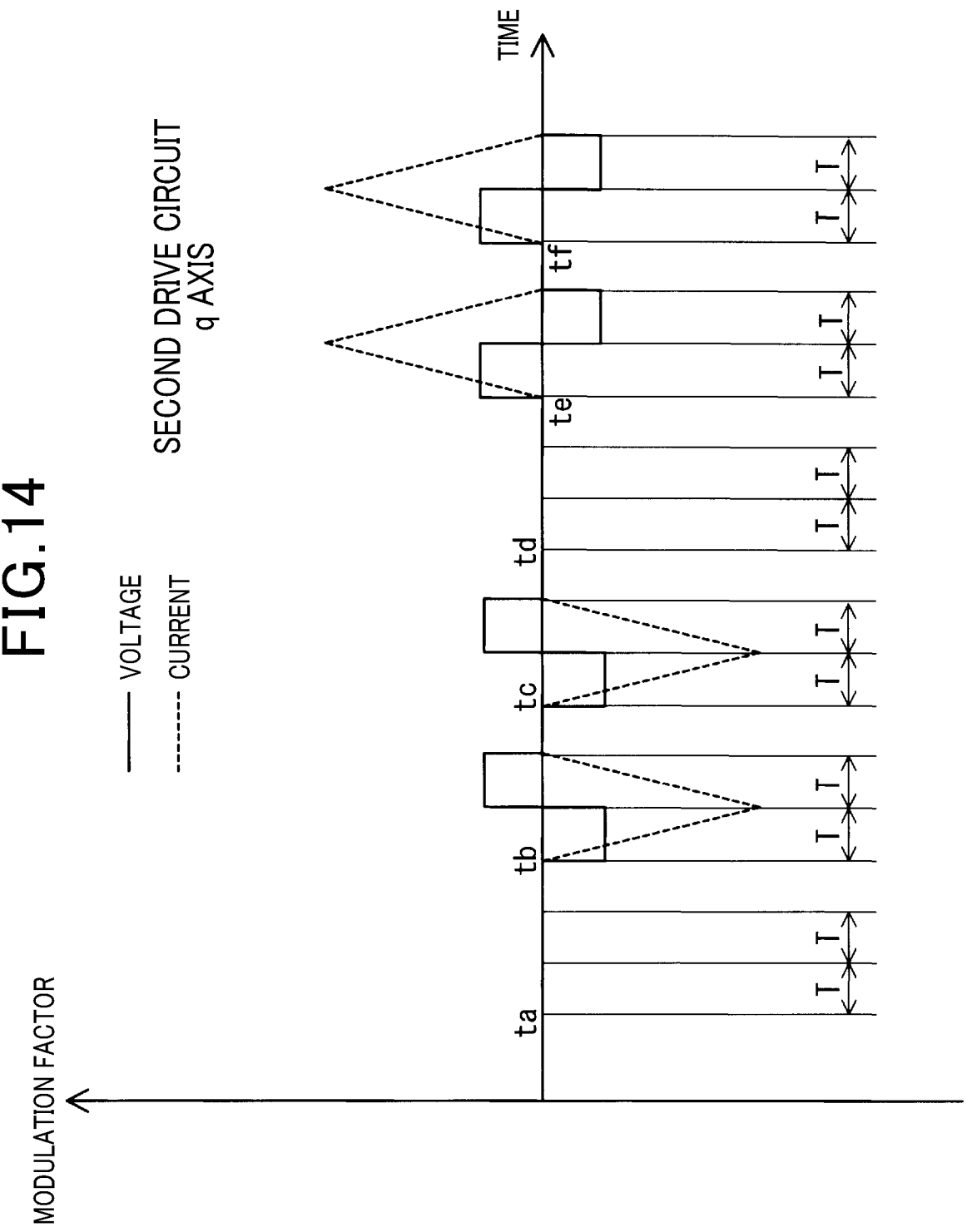
FIG. 14 is a graph indicating temporal change of modulation factors of a voltage and a current on a q axis for the second drive circuit.

A phase angle of the voltage vector VV1a is different from a phase angle of the voltage vector VV2a by 180 degrees. The phase angle of the voltage vector, that is, a direction of the voltage vector is determined by a voltage to be applied in the first period T at each time. For example, in a case of the pulse voltages to be applied from time to by the first drive circuit 30, a modulation factor of the voltage to be applied in the first period T is a positive value for the d axis as illustrated in FIG. 11, and is zero for the q axis as illustrated in FIG. 12. Therefore, the phase angle of the voltage vector by the pulse voltage is 0 degrees.

An absolute value of the voltage vector VV1a is the same as an absolute value of the voltage vector VV2a. Therefore, the voltage vector VV1a and the voltage vector VV2a have characteristics of 180° symmetry. Respective combinations of the voltage vectors VV1b to VV1f and the voltage vectors VV2b to VV2f have also characteristics of 180° symmetry.

Figure 21:
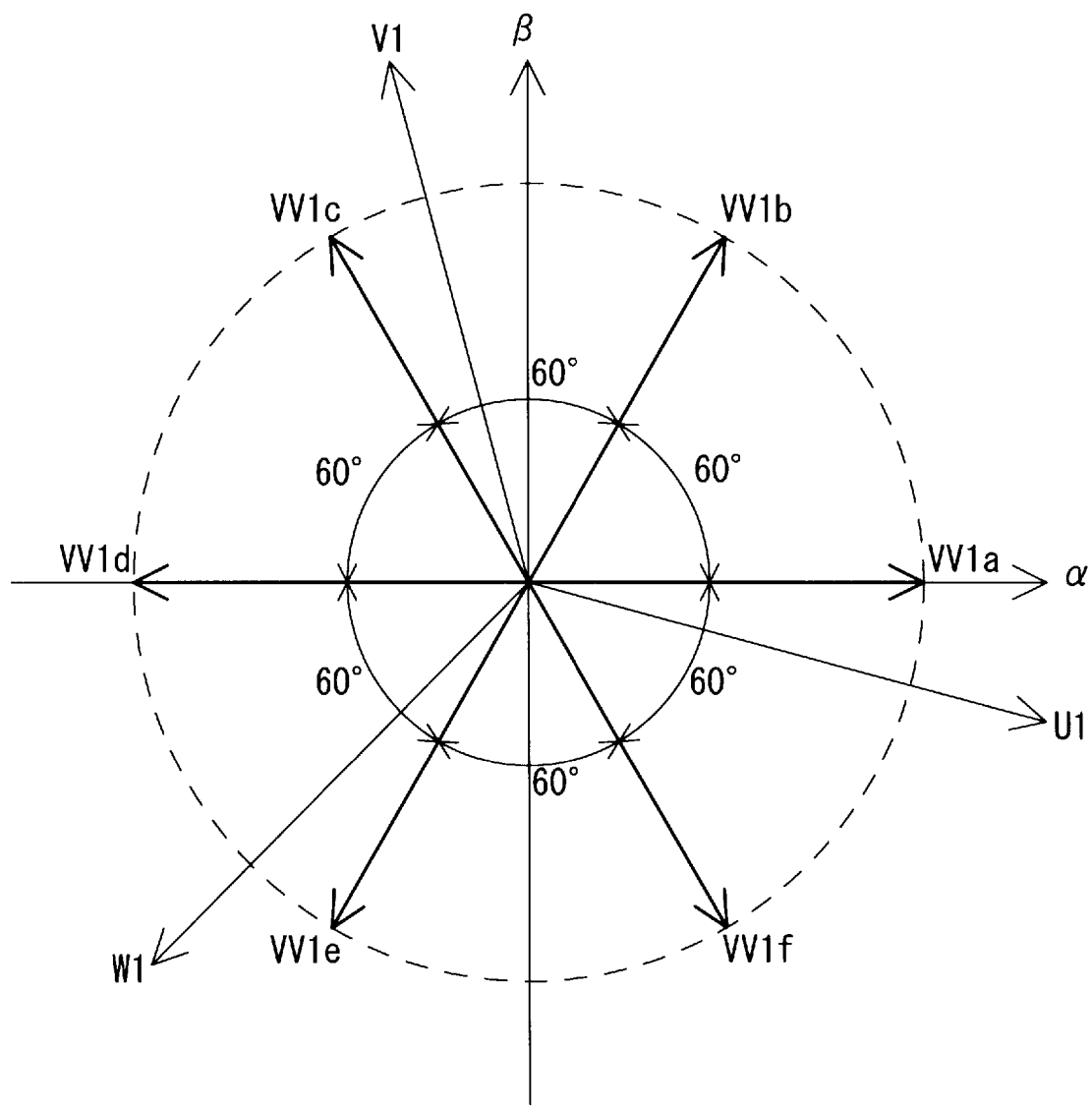
FIG. 21 is a diagram illustrating a voltage vector to be applied by the first drive circuit.
Figure 22:
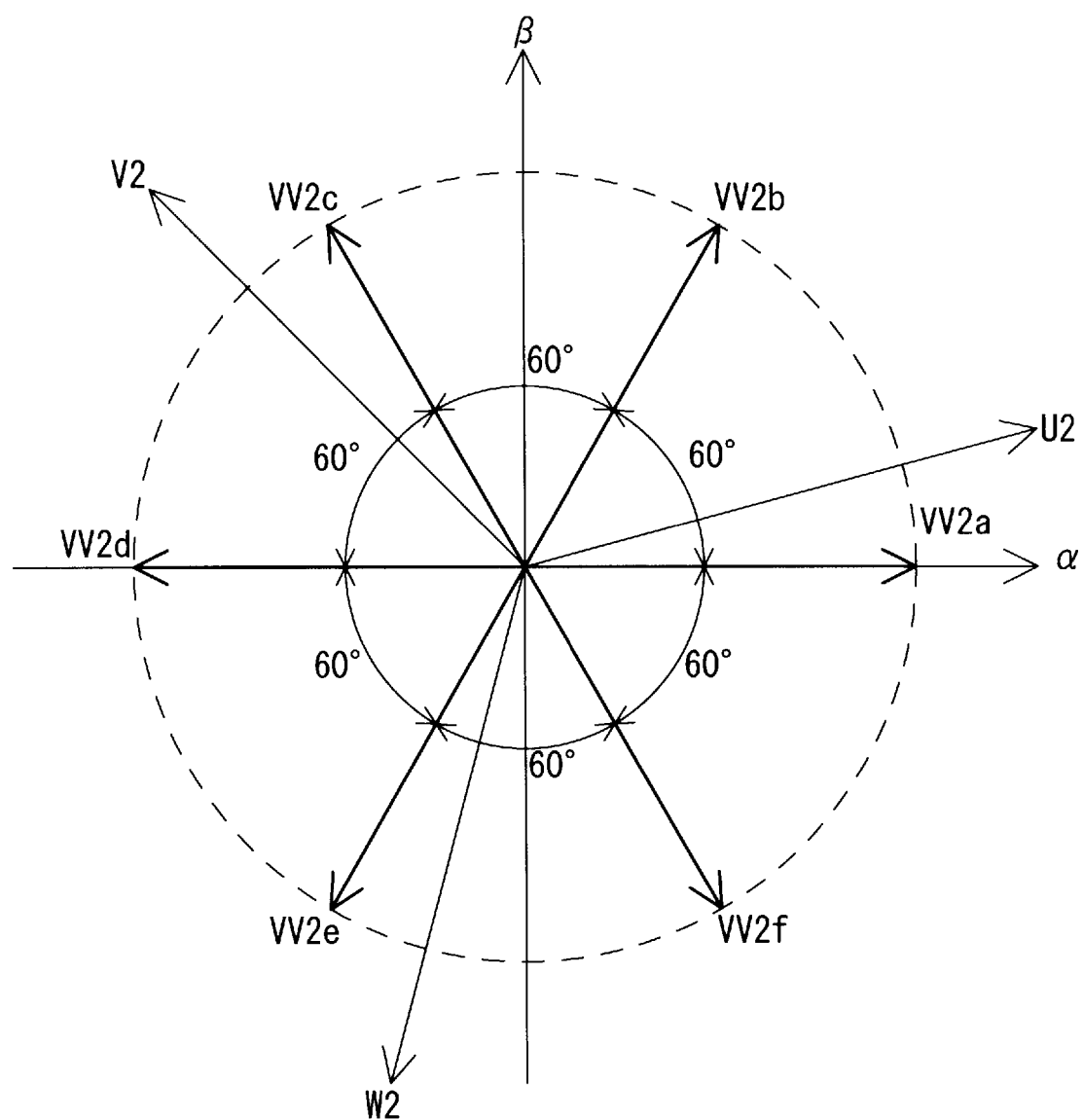
FIG. 22 is a diagram illustrating a voltage vector to be applied by the second drive circuit.

As illustrated in FIG. 21, absolute values of the voltage vectors VV1a to VV1f are equal. Therefore, as illustrated in FIG. 21, the voltage vectors VV1a to VV1f have characteristics of 60° symmetry. Because absolute values of the voltage vectors VV2a to VV2f are also equal in a similar manner as illustrated in FIG. 22, the voltage vectors VV2a to VV2f have characteristics of 60° symmetry. The current vectors are observed at intervals of 60 degrees by such characteristics of rotational symmetry. Note that, because all of the absolute values of the current vectors are not equal, the current vectors do not have characteristics of narrow definition of 60° symmetry.

Magnetic permeability along a half line from a center of the rotor 21 toward outside in a radial direction does not depend on the phase angle θe in a structure as the SPM type rotor illustrated in FIG. 2. Therefore, in the case where magnetic saturation does not occur, absolute values of the current vectors VI1a to VI1f become ideally all equal. However, in the present embodiment, because voltage amplitudes of the pulse voltages are determined so that magnetic saturation occurs, the absolute values of the current vectors VI1a to VI1f depend on the phase angle θe. Therefore, it is possible to estimate the phase angle θe.

The estimating unit 130 receives input of the current vectors VI1a to VI1f and VI2a to VI2f from the acquiring unit 120. The estimating unit 130 calculates a combined vector of the current vectors VI1a to VI1f, and VI2a to VI2f, and estimates that an angle formed by the calculated combined vector and the α axis is the phase angle θe. The above-described combined vector is equal to a combined vector of the current vector VI1R and the current vector VI2R.

Figure 23:
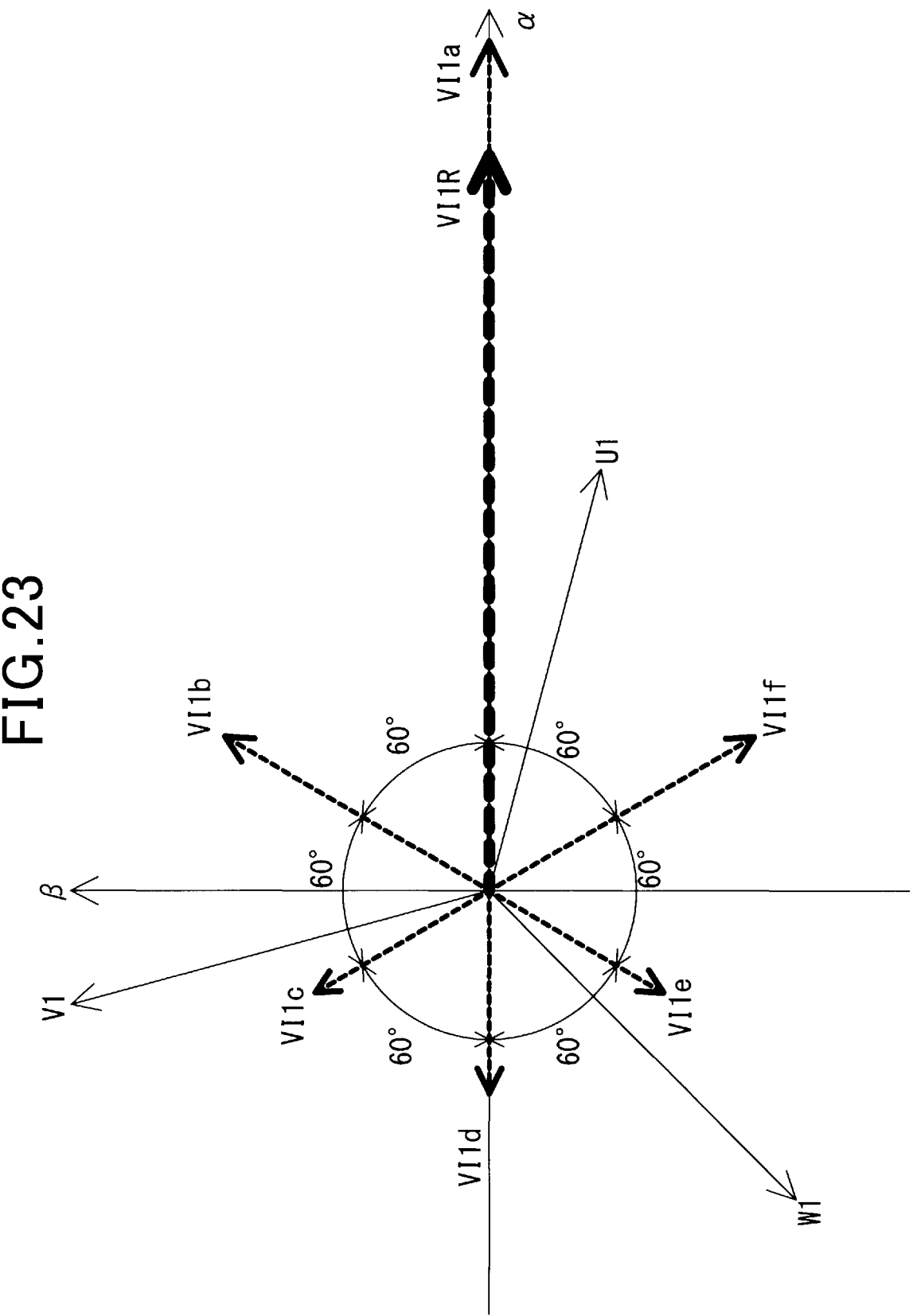
FIG. 23 is a diagram illustrating a current vector to be generated by the first drive circuit.
Figure 24:
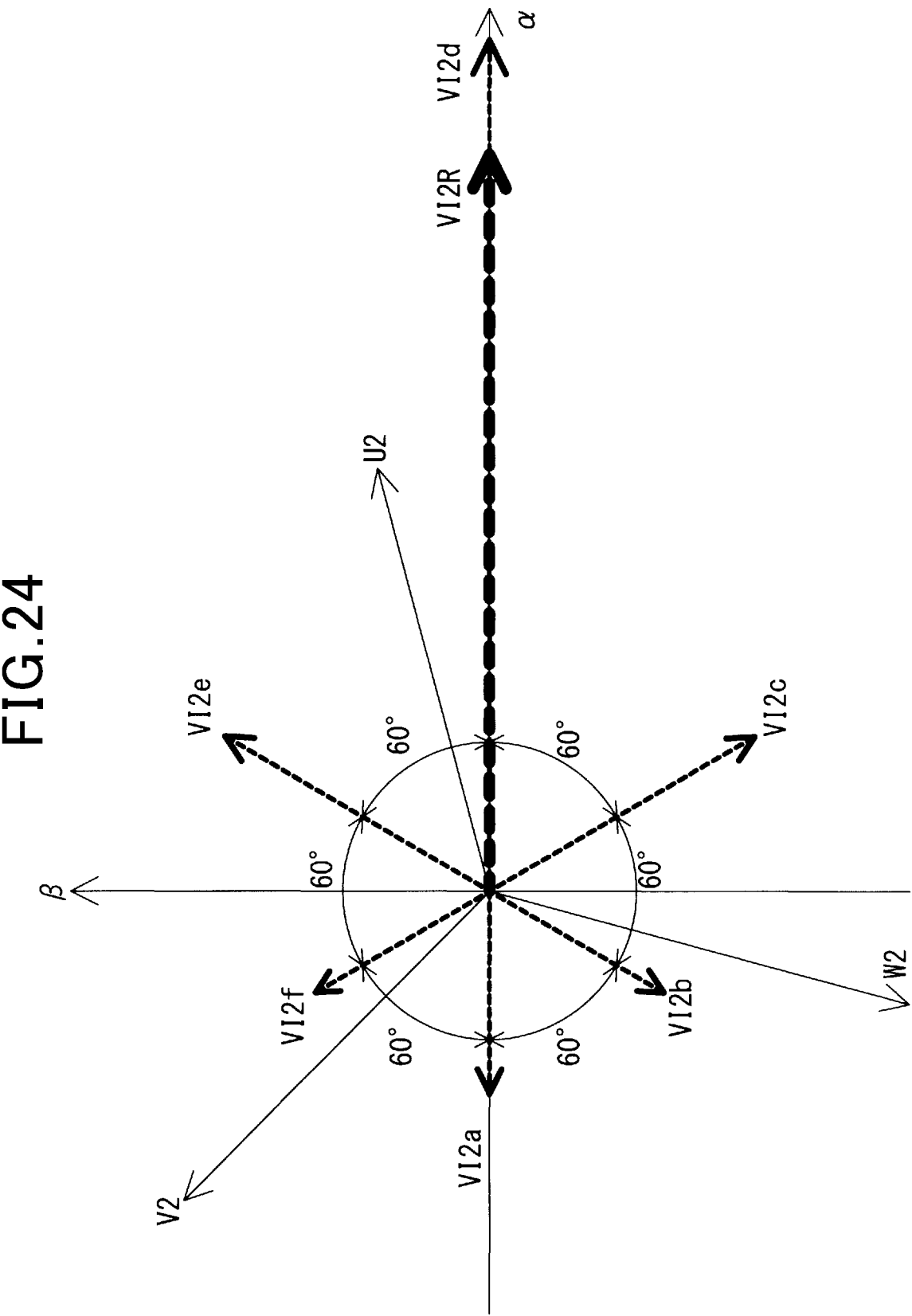
FIG. 24 is a diagram illustrating a current vector generated by the second drive circuit.

The current vector VI1R which is the combined vector of the current vectors VI1a to VI1f matches the α axis as illustrated in FIG. 23. In a similar manner, the current vector VI2R which is the combined vector of the current vectors VI2a to VI2f matches the α axis as illustrated in FIG. 24. All of these kinds of matching occur by the α axis matching the d axis, and by occurrence of the magnetic saturation.

While the current vector VI1R ideally matches the current vector VI2R, actually, there occurs some deviation. The estimating unit 130 can estimate the phase angle θe with higher accuracy by obtaining the combined vector of the current vector VI1R and the current vector VI2R.

According to the embodiment described above, it is possible to obtain at least the following effects.

(1) Noise reduction is realized even if pulse voltages which become disturbance are applied to estimate a phase angle. As illustrated in FIG. 15, it is the current vector VIRa which substantially acts as a disturbance current in a period starting from time ta. The current vector VIRa is the combined vector of the current vectors VI1a and VI2a. Because the pulse voltages are applied so that the current the current vector VI1a and the current vector VI2a are generated substantially in opposite directions, an absolute value of the current vector VIRa is smaller than an absolute value of the current vector VI1a. Therefore, even if a large pulse current is generated by occurrence of magnetic saturation, noise is reduced. This phenomenon similarly occurs also in a period starting from time td. Note that, in FIG. 15 to FIG. 20, FIG. 23 and FIG. 24, influence of the magnetic saturation is exaggerated compared to that in FIG. 5 to FIG. 14 for the purpose of illustration.

In addition, in periods starting from time tb, tc, to and tf, the absolute value of the synthesized current vectors is smaller than at least an absolute value of a larger current vector. Therefore, noise is reduced. A current vector having a component in a positive direction on the d axis corresponds to the larger current vector.

(2) Because each of the voltage vectors VV1a to VV1f and the voltage vectors VV2a to VV2f has characteristics of 60° symmetry, and the current vectors are observed at intervals of 60 degrees, it is possible to estimate the phase angle θe accurately with simple calculation.

(3) It is possible to estimate the phase angle θe through simple calculation of obtaining a combined vector.

(4) Because the above-described combined vector is calculated on the basis of the observed current vectors at each of the first drive circuit 30 and the second drive circuit 40, favorable estimation accuracy of the phase angle θe can be obtained.

(5) To realize noise reduction by characteristics of the present disclosure, at least two drive circuits are required. In the present embodiment, because noise reduction is realized using a minimum number of drive circuits, it is possible to realize the apparatus at low cost and simplify control and operation.

(6) It is optimal for noise reduction that the voltage vectors by the pulse voltages applied at the same timings are 180° symmetric at any timing.

(7) Because the pulse voltages have rectangular waves, application of the pulse voltages is easy.

(8) Because the rotor 21 includes a permanent magnet, it contributes to improvement of efficiency of the motor 20.

(9) Because the rotor 21 is an SPM type rotor, it contributes to reduction in size.

The ECU 100 corresponds to the phase angle estimation apparatus, two sets of coils 221 and 222 correspond to N sets of coils, six sets of pulse voltages correspond to M sets of pulse voltages, the current vector VI1a corresponds to the first current vector, the current vector VI1c corresponds to the second current vector, the current vector VI1e corresponds to the third current vector, the voltage vectors VV1a and VV2a correspond to vectors of N sets of first pulse voltages, the voltage vectors VV1c and VV2c correspond to vectors of N sets of second pulse voltages, and the voltage vectors VV1e and VV2e correspond to vectors of N sets of third pulse voltages. The present disclosure is not limited to the embodiment, examples and modified examples in the present specification, and can be implemented with various configurations within a range not deviating from the gist of the present invention. For example, technical features in the embodiment, examples and modified examples corresponding to technical features in each aspect described in Summary of the Invention can be appropriately replaced or combined to solve part or all of the above-described problems or to achieve part or all of the above-described effects. Further, unless it is described in the present specification that the technical features are essential, the technical features can be deleted as appropriate. For example, examples are follows.

Figure 25:
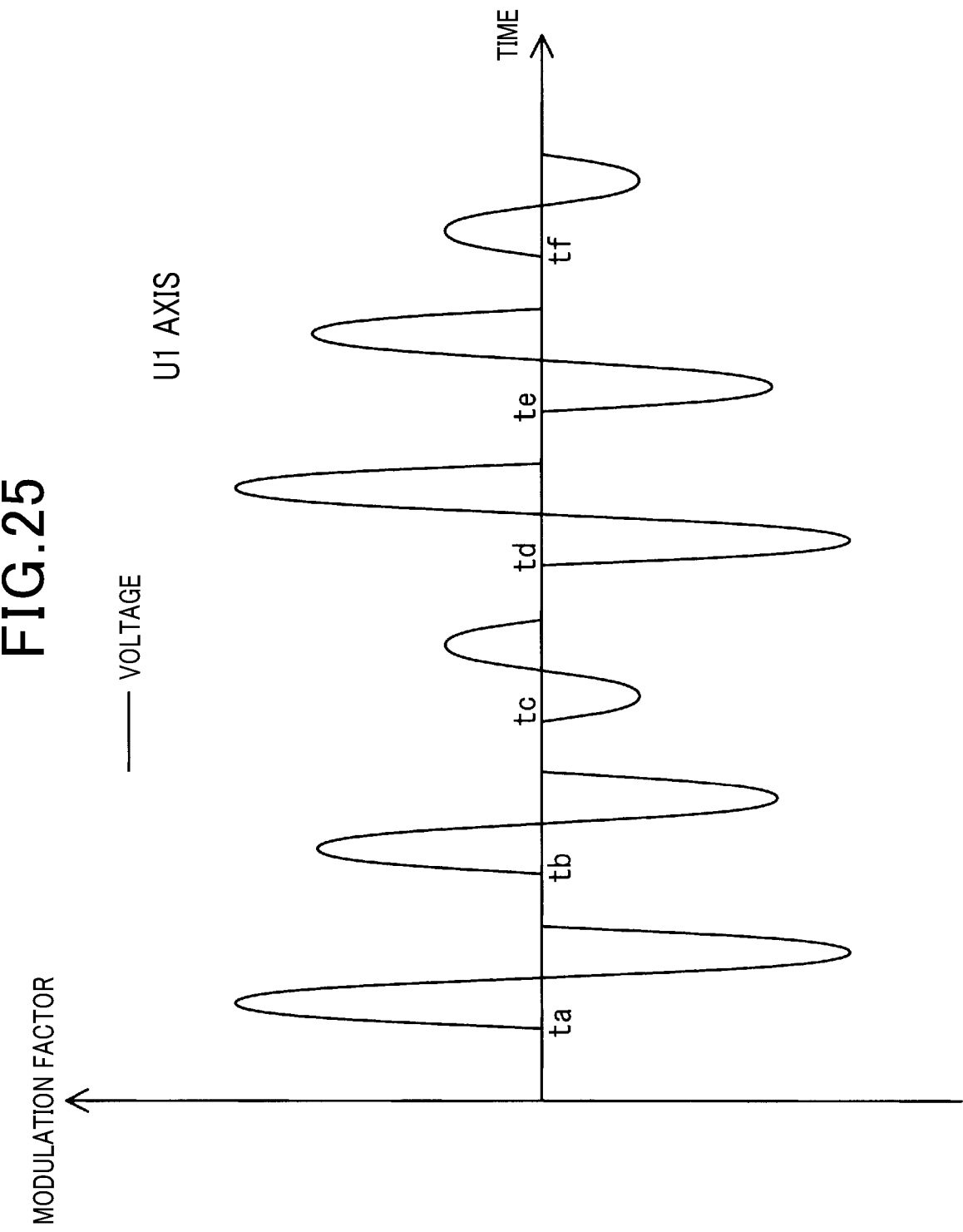
FIG. 25 is a graph indicating temporal change of modulation factors of a voltage and a current on a U1 axis.

A waveform of the pulse voltage may be a sine wave as illustrated in FIG. 25. Note that, while, in FIG. 25, an amplitude of a voltage is larger than that in FIG. 5, or the like, actually the voltage has a comparable amplitude. By the pulse voltage being a sine wave, change of a current generated becomes gradual, which is advantageous for noise reduction.

The voltage vectors to be respectively applied to the first drive circuit 30 and the second drive circuit 40 do not have to have characteristics of 180° symmetry. That is, a phase difference in N sets of voltage vectors in each period does not have to be 360/N degrees. For example, it is only necessary that the phase of the voltage vector to be applied to the first drive circuit 30 does not match the phase of the voltage vector to be applied to the second drive circuit 40. That is, noise is suppressed compared to the prior art if there is a slight phase difference in at least one time of application of pulse voltages.

However, the absolute value of the combined vector of the current vectors in each period is preferably smaller than at least the absolute value of the current vector whose absolute value is the greatest. Therefore, if N=2, that is, if there are two sets of coils, a phase difference is preferably greater than 90 degrees.

It is also possible to use a current vector of only one of the first drive circuit 30 and the second drive circuit 40 for estimation of the phase angle θe.

The rotor 21 may be an IPM type rotor. IPM is an acronym of Interior Permanent Magnet. That is, the IPM is a type in which a permanent magnet is embedded inside an iron core.

The rotor 21 does not have to include a permanent magnet. The rotor 21 may be, for example, a field-winding type rotor. The field-winding type rotor is a field in which a winding wire is wound around an iron core, and a magnetic pole is generated by a current being applied to the winding wire.

The N sets of pulse voltages do not have to be applied in the same period. That is, it is only necessary that periods in which signs of the modulation factors are different at least partly overlap with each other.

The M sets of pulse voltages to be respectively applied to the N sets of coils do not have to have characteristics of (360/M) symmetry. Even if there is some deviation, it is sufficient if the deviation is compensated for during operation.

Absolute values of the voltage vectors do not have to be all equal. For example, the voltage vectors may be set such that magnetic saturation occurs in a case of part of the voltage vectors, and magnetic saturation does not occur in a case of the remaining voltage vectors.

The motor 20 may be used in any apparatus other than the electric power steering apparatus 5.

In the above-described embodiment, part or all of functions and processing implemented with software may be implemented with hardware. Further, part or all of functions and processing implemented with hardware may be implemented with software. As hardware, for example, various kinds of circuits such as an integrated circuit, a discrete circuit and a circuit module in which these circuits are combined, may be used.

What is claimed is:

1. A phase angle estimation apparatus which estimates a phase angle of a rotor for a motor including the rotor as a field, and N (N is an integer of 2 or greater) sets of coils each having respective drive systems, the phase angle estimation apparatus comprising:
    an applying unit configured to apply first pulse voltages, apply second pulse voltages at a timing different from a timing at which the first pulse voltages are applied, and apply third pulse voltages at a timing different from the timings at which the first and the second pulse voltages are applied, to the respective N sets of coils;
    an acquiring unit configured to acquire a first current vector which is a vector of a current flowing through at least one set of coils among the N sets of coils by application of the first pulse voltages, a second current vector which is a vector of a current flowing through the at least one set of coils by application of the second pulse voltages, and a third current vector which is a vector of a current flowing through the at least one set of coils by application of the third pulse voltages; and
    an estimating unit configured to estimate the phase angle on a basis of the first, the second and the third current vectors, wherein
    at least one of conditions are satisfied, the conditions are a condition that directions of vectors of the N sets of the first pulse voltages are different from each other, a condition that directions of vectors of the N sets of the second pulse voltages are different from each other, and a condition that directions of vectors of the N sets of the third pulse voltages are different from each other, and
    periods in which voltages having different directions of the vectors among the N sets of the first, the second and the third pulse voltages are applied at least partially overlap with each other.

2. The phase angle estimation apparatus according to claim 1, wherein
    the applying unit applies M (M is an integer of 3 or greater) sets of pulse voltages including the first, the second and the third pulse voltages to the respective N sets of coils at timings which are different from each other, and
    the M sets of pulse voltages have characteristics of 360/M symmetry.

3. The phase angle estimation apparatus according to claim 1, wherein
    the estimating unit estimates the phase angle on a basis of a vector sum of the first, the second and the third current vectors.

4. The phase angle estimation apparatus according to claim 1, wherein
    the at least one set of coils are the N sets of coils,
    the acquiring unit acquires the first, the second and the third current vectors for each of the N sets of coils, and
    the estimating unit estimates the phase angle on a basis of the N sets of the first, the second, the third current vectors.

5. The phase angle estimation apparatus according to claim 1, wherein
    N is 2.

6. The phase angle estimation apparatus according to claim 1, wherein
    at least one of vectors of the N sets of the first pulse voltages, vectors of the N sets of the second pulse voltages, and vectors of the N sets of the third pulse voltages has characteristics of 360/N symmetry.

7. The phase angle estimation apparatus according to claim 1, wherein
    waveforms of the first, the second and the third pulse voltages are rectangular waves.

8. The phase angle estimation apparatus according to claim 1, wherein
    waveforms of the first, the second and the third pulse voltages are sine waves.

9. The phase angle estimation apparatus according to claim 1, wherein
    the rotor includes a permanent magnet.

10. The phase angle estimation apparatus according to claim 9, wherein
    the rotor is an SPM type rotor.

* * * * *